(12) United States Patent
Yasumura

(10) Patent No.: US 7,447,048 B2
(45) Date of Patent: Nov. 4, 2008

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 248 days.

(21) Appl. No.: 11/508,497

(22) Filed: Aug. 23, 2006

(65) Prior Publication Data
US 2007/0081365 A1   Apr. 12, 2007

(30) Foreign Application Priority Data

| Sep. 2, 2005 | (JP) | ............................ P2005-255182 |
| Sep. 5, 2005 | (JP) | ............................ P2005-256576 |
| Sep. 5, 2005 | (JP) | ............................ P2005-256577 |

(51) Int. Cl.
    *H02M 3/335*    (2006.01)
(52) U.S. Cl. ...................... 363/21.02; 363/97
(58) Field of Classification Search ............ 363/18–20, 363/21.1–21.18, 95, 96, 97, 37, 40
    See application file for complete search history.

(56) References Cited

U.S. PATENT DOCUMENTS

| 5,608,613 | A | * | 3/1997 | Jansen | ...................... 363/21.03 |
| 5,638,260 | A | * | 6/1997 | Bees | ........................... 363/17 |
| 5,991,170 | A | * | 11/1999 | Nagai et al. | .................... 363/20 |
| 6,262,897 | B1 | * | 7/2001 | Yasumura | ................. 363/21.02 |
| 6,301,128 | B1 | * | 10/2001 | Jang et al. | ....................... 363/17 |
| 6,317,337 | B1 | * | 11/2001 | Yasumura | ................. 363/21.04 |
| 6,366,476 | B1 | * | 4/2002 | Yasumura | ................. 363/21.02 |
| 6,515,875 | B2 | * | 2/2003 | Yasumura | ................. 363/21.02 |
| 6,687,137 | B1 | * | 2/2004 | Yasumura | ................. 363/21.01 |
| 6,831,846 | B2 | * | 12/2004 | Yasumura | ................. 363/21.02 |

FOREIGN PATENT DOCUMENTS

JP         2000-134925 A      5/2000

* cited by examiner

*Primary Examiner*—Rajnikant B Patel
(74) *Attorney, Agent, or Firm*—Lerner, David, Littenberg, Krumholz & Mentlik, LLP

(57) ABSTRACT

In the switching power supply circuit disclosed in the present invention, the DC voltage is supplied to the primary winding in the converter transformer and the AC voltage is generated. First and second series resonant circuit are formed, and the resonant frequency of the first and second series resonant circuits are set to be substantially equal to each other. A parallel resonant circuit is formed, and the resonant frequency of the parallel resonant circuit is set higher than the resonant frequencies of the first and second series resonant circuits. The secondary winding includes first and second secondary windings so that currents are extracted from the first and second secondary windings, respectively, and a ratio of the number of turns of the first secondary winding to that of the second secondary winding is defined so that magnitudes of the currents are substantially equal to each other.

5 Claims, 12 Drawing Sheets

SWITCHING POWER SUPPLY CIRCUIT

CROSS REFERENCES TO RELATED APPLICATIONS

The present invention contains subject matter related to Japanese Patent Application JP 2005-255182 filed in the Japanese Patent Office on Sep. 2, 2005 and Japanese Patent Applications JP 2005-256576 and JP 2005-256577 filed in the Japanese Patent Office on Sep. 5, 2005, the entire contents of which being incorporated herein by reference.

BACKGROUND OF THE INVENTION

1. Field of the Invention

The present invention relates to a switching power supply circuit.

2. Description of the Related Art

As types of a so-called soft switching power supply that employs a resonant converter, a current resonant type and a voltage resonant type have been widely known. Currently, half-bridge current resonant converters formed of a two-transistor switching element have been widely employed since they can easily be put into practical use.

However, since characteristics of high-breakdown-voltage switching elements are currently being improved for example, problems about breakdown voltage associated with putting voltage resonant converters into practical use are being cleared up. Furthermore, it is known that a single-ended voltage resonant converter formed of a one-transistor switching element is advantageous over a one-transistor current resonant forward converter in terms of input feedback noise and noise components of a DC output voltage line.

FIG. 10 illustrates one configuration example of a switching power supply circuit including a single-ended voltage resonant converter.

In the switching power supply circuit of FIG. 10, a voltage from a commercial alternating-current power supply AC is rectified and smoothed by a rectifying and smoothing circuit formed of a bridge rectifier circuit Di and a smoothing capacitor Ci, to thereby produce a rectified and smoothed voltage Ei as the voltage across the smoothing capacitor Ci.

The lines from the commercial power supply AC are provided with a noise filter that includes a pair of common mode choke coils CMC and two across-line capacitors CL, and removes common mode noise.

The rectified and smoothed voltage Ei is input to the voltage resonant converter as a DC input voltage. The voltage resonant converter has a single-ended configuration including a one-transistor switching element Q1 as described above. The voltage resonant converter in this circuit is separately excited. Specifically, the switching element Q1 formed of a MOS-FET is switch-driven by an oscillation and drive circuit 2.

A body diode DD of the MOS-FET is connected in parallel to the switching element Q1. In addition, a primary-side parallel resonant capacitor Cr is connected in parallel to the channel between the drain and source of the switching element Q1.

The primary-side parallel resonant capacitor Cr and the leakage inductance L1 of a primary winding N1 in an isolation converter transformer PIT form a primary-side parallel resonant circuit (voltage resonant circuit). This primary-side parallel resonant circuit offers voltage resonant operation as the switching operation of the switching element Q1.

In order to switch-drive the switching element Q1, the oscillation and drive circuit 2 applies a gate voltage as a drive signal to the gate of the switching element Q1. Thus, the switching element Q1 implements switching operation with the switching frequency dependent upon the cycle of the drive signal.

The isolation converter transformer PIT transmits switching outputs from the switching element Q1 to the secondary side.

The isolation converter transformer PIT is constructed of an EE-shaped core that is formed by combining E-shaped cores composed of a ferrite material for example. Furthermore, the primary winding N1 and a secondary winding N2 are wound around the center magnetic leg of the EE-shaped core, with the winding part being divided into the primary side and secondary side.

In addition, a gap with a length of about 1.0 mm is provided in the center leg of the EE-shaped core in the isolation converter transformer PIT, so that a coupling coefficient k of about 0.80 to 0.85 is obtained between the primary side and the secondary side. When the coupling coefficient k has such a value, the coupling degree between the primary and secondary sides may be regarded as loose coupling, and thus it is difficult to obtain the saturation state. The value of the coupling coefficient k is a factor in setting the leakage inductance (L1).

One end of the primary winding N1 in the isolation converter transformer PIT is interposed between the switching element Q1 and the positive electrode of the smoothing capacitor Ci. Thus, the transmission of the switching output from the switching element Q1 is allowed. In the secondary winding N2 of the isolation converter transformer PIT, an alternating voltage induced by the primary winding N1 is generated.

On the secondary side, a secondary-side series resonant capacitor C2 is connected in series to one end of the secondary winding N2, and therefore the leakage inductance L2 of the secondary winding N2 and the capacitance of the secondary-side series resonant capacitor C2 form a secondary-side series resonant circuit (current resonant circuit).

Furthermore, rectifier diodes Do1 and Do2 and a smoothing capacitor Co are connected to this secondary-side series resonant circuit as shown in the drawing, so that a voltage-doubler half-wave rectifier circuit is formed. This voltage-doubler half-wave rectifier circuit produces, as the voltage across the smoothing capacitor Co, a secondary-side DC output voltage Eo with the level twice that of an alternating voltage V2 induced in the secondary winding N2. The secondary-side DC output voltage Eo is supplied to a load, and is input to a control circuit 1 as a detected voltage for constant-voltage control.

The control circuit 1 detects the level of the secondary-side DC output voltage Eo input as a detected voltage, and then inputs the obtained detection output to the oscillation and drive circuit 2.

The oscillation and drive circuit 2 outputs a drive signal of which frequency and so on are varied depending on the level of the secondary-side DC output voltage Eo indicated by the detection output, to thereby control the switching operation of the switching element Q1 so that the secondary-side DC output voltage Eo is kept constant at a predetermined level. Thus, stabilization control of the secondary-side DC output voltage Eo is achieved.

FIGS. 11A to 11C and 12 show experimental results on the power supply circuit in FIG. 10. For the experiments, major parts in the power supply circuit of FIG. 10 were designed to have the following parameters.

The core of the isolation converter transformer PIT employed an EER-35 core, and a gap in the center leg thereof was designed to have a gap length of 1 mm. The numbers of turns of the primary winding N1 and the secondary winding N2 were set to 39 T and 23 T, respectively. The induction voltage level per one turn (T) in the secondary winding N2 was set to 3 V/T. The coupling coefficient k of the isolation converter transformer PIT was set to 0.81.

The capacitance of the primary-side parallel resonant capacitor Cr was set to 3900 pF. The capacitance of the secondary-side series resonant capacitor C2 was set to 0.1 µF. Accordingly, the resonant frequency fo1 of the primary-side parallel resonant circuit was set to 230 kHz, and the resonant frequency fo2 of the secondary-side series resonant circuit was set to 82 kHz. Therefore, the relative relationship between the resonant frequencies fo1 and fo2 can be represented as fo1≈2.8×fo2.

The rated level of the secondary-side DC output voltage Eo was 135 V. The allowable load power range was from the maximum load power Pomax of 200 W to the minimum load power Pomin of 0 W.

FIGS. 11A to 11C are waveform diagrams showing the operation of the major parts in the power supply circuit in FIG. 10, with reflecting the corresponding switching cycle of the switching element Q1. FIG. 11A shows a voltage V1, a switching current IQ1, a primary winding current I1, a secondary winding current I2, and secondary-side rectified currents ID1 and ID2, when the load power is the maximum load power Pomax of 200 W and the AC input voltage VAC of 100 V. FIG. 11B shows the voltage V1, the switching current IQ1, the primary winding current I1, and the secondary winding current I2, when the load power is intermediate load power Po of 120 W. FIG. 11C shows the voltage V1 and the switching current IQ1 when the load power is the minimum load power Pomin of 0 W.

The voltage V1 is the voltage obtained across the switching element Q1, and has a waveform like those in FIGS. 11A to 11C. Specifically, the voltage level is at zero level during the period TON when the switching element Q1 is in the on-state, while a sinusoidal resonant pulse is obtained during the period TOFF when it is in the off-state. This resonant pulse waveform of the voltage V1 indicates that the operation of the primary-side switching converter is voltage resonant operation.

The switching current IQ1 is the current flowing through the switching element Q1 (and the body diode DD). The switching current IQ1 flows with the illustrated waveforms during the period TON, while it is at zero level during the period TOFF.

The primary winding current I1 flowing through the primary winding N1 is the current resulting from the synthesis between the current flowing as the switching current IQ1 during the period TON and the current flowing to the primary-side parallel resonant capacitor Cr during the period TOFF.

The rectified currents ID1 and ID2, shown only in FIG. 11A, flowing through the rectifier diodes Do1 and Do2 as the operation of the secondary-side rectifier circuit have sinusoidal waveforms like the illustrated ones. The waveform of the rectified current ID1 indicates the resonant operation of the secondary-side series resonant circuit more dominantly than the waveform of the rectified current ID2.

The secondary winding current I2 flowing through the secondary winding N2 has a waveform resulting from the synthesis between the waveforms of the rectified currents ID1 and ID2.

FIG. 12 shows, as functions of the load, the switching frequency fs, the lengths of ON and OFF periods TON and TOFF of the switching element Q1, and the AC to DC power conversion efficiency (ηAC→DC) of the power supply circuit shown in FIG. 10.

Referring initially to the AC to DC power conversion efficiency (ηAC→DC), it is apparent that high efficiency of 90% or more is achieved in a wide range of the load power Po from 50 W to 200 W. The inventor of the present application has previously confirmed, based on experiments, that such a characteristic is obtained when a single-ended voltage resonant converter is combined with a secondary-side series resonant circuit.

In addition, the switching frequency fs, the period TON, and the period TOFF in FIG. 12 indicate the switching operation of the power supply circuit in FIG. 10 as the characteristic of constant-voltage control against load variation. In the power supply circuit, the switching frequency fs is almost constant against the load variation. In contrast, the periods TON and TOFF show linear changes having opposite tendencies as shown in FIG. 12. These characteristics show that the switching operation is controlled against the variation of the secondary-side DC output voltage Eo such that the time ratio between the ON and OFF periods is changed with the switching frequency (switching cycle) being kept almost constant. This control can be regarded as pulse width modulation (PWM) control, in which the lengths of the ON and OFF periods within one switching cycle are changed. This PWM control allows the power supply circuit in FIG. 10 to stabilize the secondary-side DC output voltage Eo.

FIG. 13 schematically shows the constant-voltage control characteristic of the power supply circuit shown in FIG. 10, based on the relationship between the switching frequency fs (kHz) and the secondary-side DC output voltage Eo.

The power supply circuit shown in FIG. 10 includes a primary-side parallel resonant circuit and a secondary-side series resonant circuit, and therefore has two resonant impedance characteristics in a complex manner: the resonant impedance characteristic corresponding to the resonant frequency fo1 of the primary-side parallel resonant circuit, and that corresponding to the resonant frequency fo2 of the secondary-side series resonant circuit. Since the power supply circuit in FIG. 10 has the frequency relationship fo1≈2.8×fo2, the secondary-side series resonant frequency fo2 is lower than the primary-side parallel resonant frequency fo1 also as shown in FIG. 13.

The characteristic curves in FIG. 13 show a constant-voltage control characteristic that depends on control of the switching frequency fs and is assumed based on these resonant frequencies and under the condition of a certain constant AC input voltage VAC. Specifically, Characteristic curves A and B correspond to the maximum load power Pomax and the minimum load power Pomin, respectively, and indicate the constant-voltage control characteristic in relation to the resonant impedance corresponding to the resonant frequency fo1 of the primary-side parallel resonant circuit. Characteristic curves C and D correspond to the maximum load power Pomax and the minimum load power Pomin, respectively, and indicate the constant-voltage control characteristic in relation to the resonant impedance corresponding to the resonant frequency fo2 of the secondary-side series resonant circuit. When, under the characteristic in FIG. 13, constant-voltage control is intended so that the output voltage is kept at the voltage tg that is the rated level of the secondary-side DC output voltage Eo, the variation range of the switching frequency fs required for the constant-voltage control (requisite control range) can be expressed by the section indicated by Δfs.

The requisite control range Δfs shown in FIG. 13 is from the frequency offering the voltage level tg on Characteristic curve C, corresponding to the resonant frequency fo2 of the secondary-side series resonant circuit and the maximum load power Pomax, to that on Characteristic curve B, corresponding to the resonant frequency fo1 of the primary-side parallel resonant circuit and the minimum load power Pomin. The range Δfs includes the frequency offering the voltage level tg on Characteristic curve D, corresponding to the resonant frequency fo2 of the secondary-side series resonant circuit and the minimum load power Pomin, and that on Characteristic curve A, corresponding to the resonant frequency fo1 of the primary-side parallel resonant circuit and the maximum load power Pomax.

Therefore, as constant-voltage control operation, the power supply circuit in FIG. 10 implements switching drive control based on PWM control in which the time ratio of the periods TON/TOFF in one switching cycle is changed with the switching frequency fs being kept almost constant. The implementation of the PWM control is indicated also by FIGS. 11A to 11C, in which the widths of the periods TOFF and TON change depending on the load power while the length of one switching cycle (TOFF+TON) is almost constant irrespective of the load power.

This operation is due to such a resonant impedance characteristic of the power supply circuit against load variation that transition is implemented, in the narrow switching frequency range (Δfs), between the state where the resonant impedance corresponding to the resonant frequency fo1 of the primary-side parallel resonant circuit (capacitive impedance) is dominant, and the state where the resonant impedance corresponding to the resonant frequency fo2 of the secondary-side series resonant circuit (inductive impedance) is dominant.

The related art of the invention is disclosed in e.g. Japanese Patent Laid-Open No. 2000-134925.

SUMMARY OF THE INVENTION

The power supply circuit in FIG. 10 involves the following problems.

Referring to the aforedescribed waveform diagrams of FIGS. 11A to 11C, the switching current IQ1 when the load power is the maximum load power Pomax, shown in FIG. 11A, operates as follows. Specifically, the switching current IQ1 is at zero level until the end of the period TOFF, which is the turn on timing of the switching element Q1. When the period TON starts, initially a current of the negative polarity flows through the body diode DD, and then the polarity is inverted and the switching current IQ1 flows between the drain and source of the switching element Q1. This operation indicates the state where zero voltage switching (ZVS) is adequately carried out.

In contrast, the switching current IQ1 when the load power is the intermediate load power Po of 120 W, shown in FIG. 11B, shows a waveform in which a noise current flows at timing immediately before the end of the period TOFF, which is the turn-on timing of the switching element Q1. This waveform indicates abnormal operation in which ZVS is not implemented adequately.

That is, it is known that a voltage resonant converter including a secondary-side series resonant circuit as shown in FIG. 10 involves abnormal operation in which ZVS is not implemented adequately when the load is an intermediate load. It has been confirmed that, in an actual power supply circuit of FIG. 10, such abnormal operation arises in the load variation range indicated by the section A in FIG. 12 for example.

A voltage resonant converter including a secondary-side series resonant circuit originally has a tendency to have a characteristic of keeping high efficiency favorably against load variation as described above. However, as shown with the switching current IQ1 of FIG. 11B, a corresponding peak current flows at the turn-on timing of the switching element Q1. This noise current causes an increase of switching loss, which is a factor in a decrease of the power conversion efficiency.

In addition, the occurrence of such abnormal operation anyway yields an offset of the phase-gain characteristic of the constant-voltage control circuitry for example, which leads to switching operation in an abnormal oscillation state. Therefore, currently there is a strong recognition that it is difficult to put the voltage resonant converter into practical use in actual.

In consideration of the above-described problem, an embodiment of the present invention provides a switching power supply circuit having the following configuration.

The power supply circuit includes a switching element that implements switching for a DC voltage to thereby convert the DC voltage into an AC voltage, a converter transformer in which the AC voltage is input to a primary winding so that an AC voltage is generated in a secondary winding, a secondary-side rectifying and smoothing circuit that includes a secondary-side rectifier element and a secondary-side smoothing capacitor for rectifying and smoothing the AC voltage generated in the secondary winding to thereby produce an output DC voltage, and a switching element control unit that controls the switching element based on the output DC voltage.

In the power supply circuit, the DC voltage is supplied to one winding end of the primary winding in the converter transformer via a choke coil, and the switching element is connected to the other winding end of the primary winding in the converter transformer so that the AC voltage is generated. Furthermore, a series resonant capacitor is coupled to the connecting node between the one winding end of the primary winding in the converter transformer and the choke coil, so that a first series resonant circuit of which resonant frequency is dominated by the leakage inductance arising in the primary winding in the converter transformer and the series resonant capacitor is formed, and so that a second series resonant circuit of which resonant frequency is dominated by the inductance of the choke coil and the series resonant capacitor is formed, and the resonant frequency of the first series resonant circuit and the resonant frequency of the second series resonant circuit are set to be substantially equal to each other. In addition, a parallel resonant circuit of which resonant frequency is dominated by a primary-side parallel resonant capacitor connected in parallel to the switching element, the inductance of the choke coil and the leakage inductance arising in the primary winding is formed, and the resonant frequency of the parallel resonant circuit is set higher than the resonant frequency of the first series resonant circuit and the resonant frequency of the second series resonant circuit. Moreover, the secondary winding includes a first secondary winding and a second secondary winding so that currents in the directions of the opposite polarities are extracted from the first and second secondary windings through first and second rectifier diodes, respectively, included in the secondary-side rectifier element, and the ratio of the number of turns of the first secondary winding to the number of turns of the second secondary winding is defined so that the magnitudes of the currents in the directions of the opposite polarities are substantially equal to each other.

The power supply circuit with the above-described configuration includes a primary-side rectifying and smoothing circuit that includes a primary-side rectifier element and a primary-side smoothing capacitor for producing a DC voltage, a switching element that implements switching for the DC voltage to thereby convert the DC voltage into an AC voltage, a converter transformer in which the AC voltage is input to a primary winding so that an AC voltage is generated in a secondary winding, a secondary-side rectifying and smoothing circuit that includes a secondary-side rectifier element and a secondary-side smoothing capacitor for rectifying and smoothing the AC voltage generated in the secondary winding to thereby produce an output DC voltage, and a switching element control unit that controls the switching element based on the output DC voltage.

In addition, the power supply circuit has the following features. The DC voltage is supplied to one winding end of the primary winding in the converter transformer via a choke coil, and the switching element is connected to the other winding end of the primary winding in the converter transformer so that the AC voltage is generated. Thus, the operation of the power supply circuit is close to so-called class-E operation, and the current supplied from a smoothing and rectifying circuit has a ripple waveform close to a DC component.

Furthermore, a series resonant capacitor is coupled to the connecting node between the one winding end of the primary winding in the converter transformer and the choke coil, so that a first series resonant circuit of which resonant frequency is dominated by the leakage inductance arising in the primary winding in the converter transformer and the series resonant capacitor is formed, and so that a second series resonant circuit of which resonant frequency is dominated by the inductance of the choke coil and the series resonant capacitor is formed, and the resonant frequency of the first series resonant circuit and the resonant frequency of the second series resonant circuit are set to be substantially equal to each other. Moreover, a parallel resonant circuit of which resonant frequency is dominated by a primary-side parallel resonant capacitor connected in parallel to the switching element, the inductance of the choke coil and the leakage inductance arising in the primary winding is formed, and the resonant frequency of the parallel resonant circuit is set higher than the resonant frequency of the first series resonant circuit and the resonant frequency of the second series resonant circuit. Thus, so-called current and voltage resonant converters are constructed, so that the frequency of the AC voltage can be controlled within a small range for control of the output DC voltage.

In addition, the secondary winding includes a first secondary winding and a second secondary winding so that currents in the directions of the opposite polarities are extracted from the first and second secondary windings through first and second rectifier diodes, respectively, included in the secondary-side rectifier element, and the ratio of the number of turns of the first secondary winding to the number of turns of the second secondary winding is defined so that the magnitudes of the currents in the directions of the opposite polarities are substantially equal to each other. Thus, the currents can be extracted from the secondary winding effectively.

According to the embodiment of the present invention, abnormal operation in which zero voltage switching (ZVS) operation is not achieved in an intermediate load condition range is eliminated from a switching power supply circuit including a parallel resonant circuit on its primary side.

Moreover, as described above, reduction of power loss is achieved due to a decrease of the amount of the current flowing in the power supply circuit, and thus the total power conversion efficiency characteristic is greatly improved.

DETAILED DESCRIPTION OF THE PREFERRED EMBODIMENTS

Prior to description of best modes (embodiments, hereinafter) for carrying out the present invention, the basic configuration of a switching converter that implements class-E resonant switching operation (referred to also as a class-E switching converter, hereinafter) as a background art of the embodiments will be described below with reference to FIGS. 8 and 9.

Figure 8:
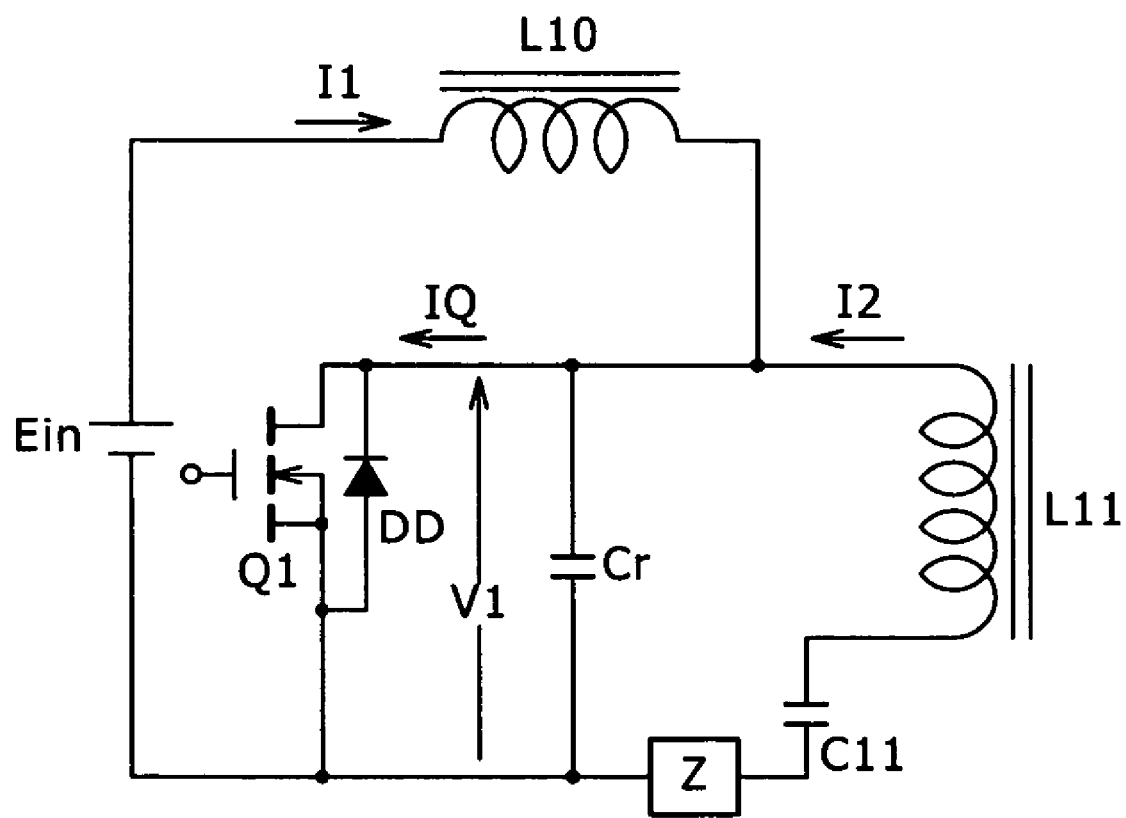
FIG. 8 is a circuit diagram illustrating a basic configuration example of a class-E switching converter.

FIG. 8 illustrates the basic configuration of a class-E switching converter. The class-E switching converter in this drawing has a configuration as a DC-AC inverter that operates in a class-E resonant mode.

This class-E switching converter includes a one-transistor switching element Q1. The switching electrode Q1 is a MOS-FET in this converter. A body diode DD is connected in parallel to the channel between the drain and source of the MOS-FET switching element Q1. The forward direction of the body diode DD is the same as the direction from the source to the drain of the switching element Q1.

In addition, a primary-side parallel resonant capacitor Cr is connected in parallel to the channel between the drain and source of the switching element Q1.

The drain of the switching element Q1 is connected in series to a choke coil L10, and is coupled via the choke coil L10 to the positive electrode of a DC input power supply Ein. The source of the switching element Q1 is connected to the negative electrode of the DC input power supply Ein.

The drain of the switching element Q1 is connected to one end of a choke coil L11. The other end of the choke coil L11 is connected in series to a series resonant capacitor C11. An impedance Z as a load is interposed between the series resonant capacitor C11 and the negative electrode of the DC input power supply Ein. Specific examples of the impedance Z include a piezoelectric transformer and a high-frequency-compatible fluorescent lamp.

The class-E switching converter with this configuration can be regarded as one form of a complex resonant converter that includes a parallel resonant circuit formed of the inductance of the choke coil L10 and the capacitance of the primary-side parallel resonant capacitor Cr, and a series resonant circuit formed of the inductance of the choke coil L11 and the capacitance of the series resonant capacitor C11. In addition, since the class-E switching converter includes only one switching element, it can be regarded as equivalent to a single-ended voltage resonant converter.

Figure 9:
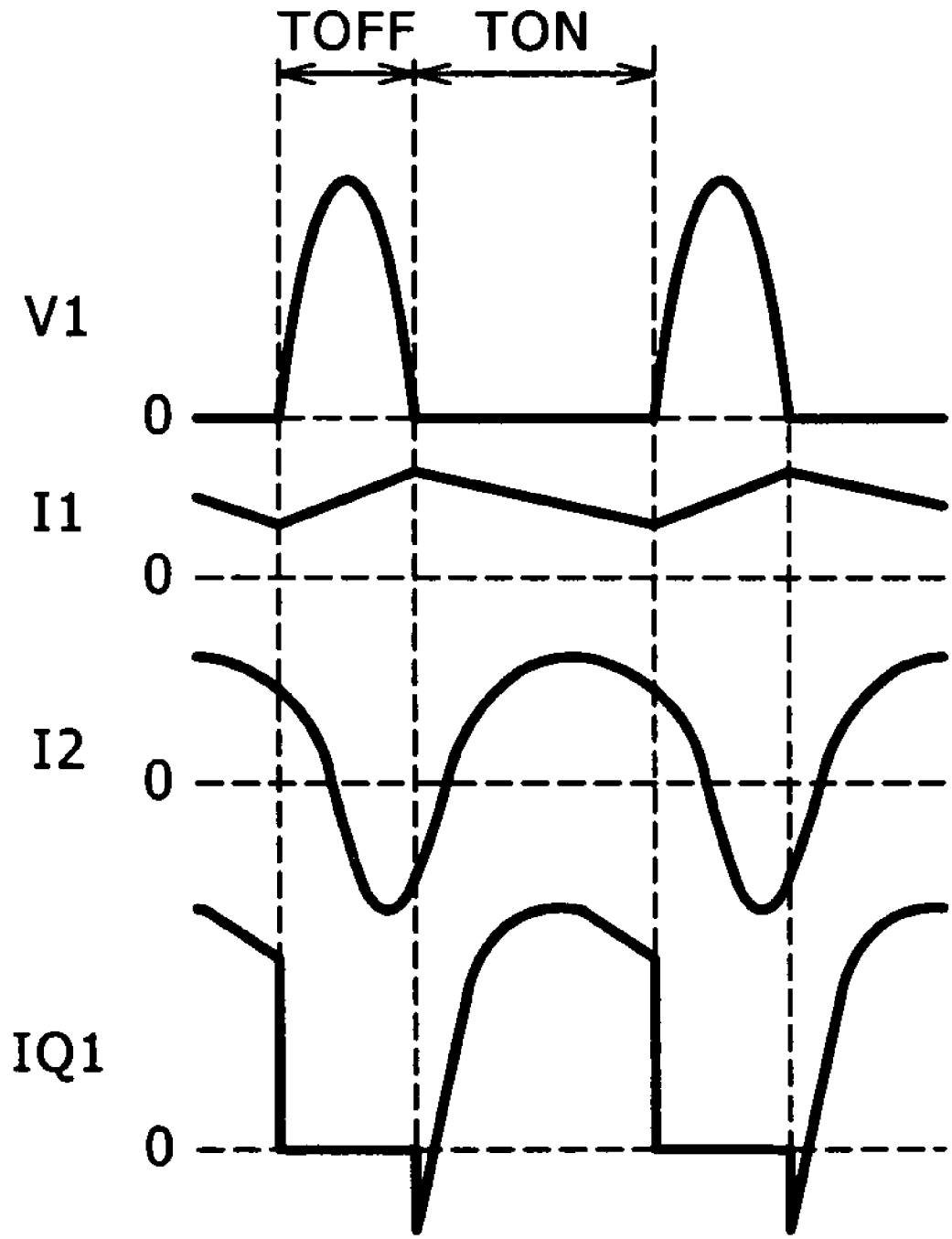
FIG. 9 is a waveform diagram showing the operation of the class-E switching converter shown in FIG. 8.

FIG. 9 shows the operation of major parts in the class-E switching converter shown in FIG. 8.

A switching voltage V1 is the voltage obtained across the switching element Q1, and has a waveform like that in FIG. 9. Specifically, the voltage level is at zero level during the period TON when the switching element Q1 is in the on-state, while a sinusoidal pulse is obtained during the period TOFF when it is in the off-state. This switching pulse waveform is due to the resonant operation (voltage resonant operation) of the above-described parallel resonant circuit.

A switching current IQ1 is the current flowing through the switching element Q1 (and the body diode DD). During the period TOFF, the switching current IQ1 is at zero level. During the period TON, the switching current IQ1 has a certain waveform like illustrated one. Specifically, during a certain period from the start of the period TON, the switching current IQ1 initially flows through the body diode DD, and thus has the negative polarity. Subsequently, the switching current IQ1 is inverted to the positive polarity, and thus flows from the drain to the source of the switching element Q1.

A current I2 flowing through the series resonant circuit as an output of the class-E switching converter results from the synthesis between the switching current IQ1 flowing through the switching element Q1 (and the body diode DD) and the current flowing to the primary-side parallel resonant capacitor Cr, and has a waveform including sinusoidal wave components.

The waveforms of the switching current IQ1 and the switching voltage V1 indicate that ZVS operation is achieved at the turn-off timing of the switching element Q1, and ZVS and ZCS operations are achieved at the turn-on timing thereof.

A current I1 flowing from the positive electrode of the DC input power supply Ein through the choke coil L10 to the class-E switching converter has a ripple waveform with a certain average current level like the illustrated one, since the inductance of the choke coil L10 is set larger than that of the choke coil L11. This ripple current can be regarded as a DC current approximately.

Figure 1:
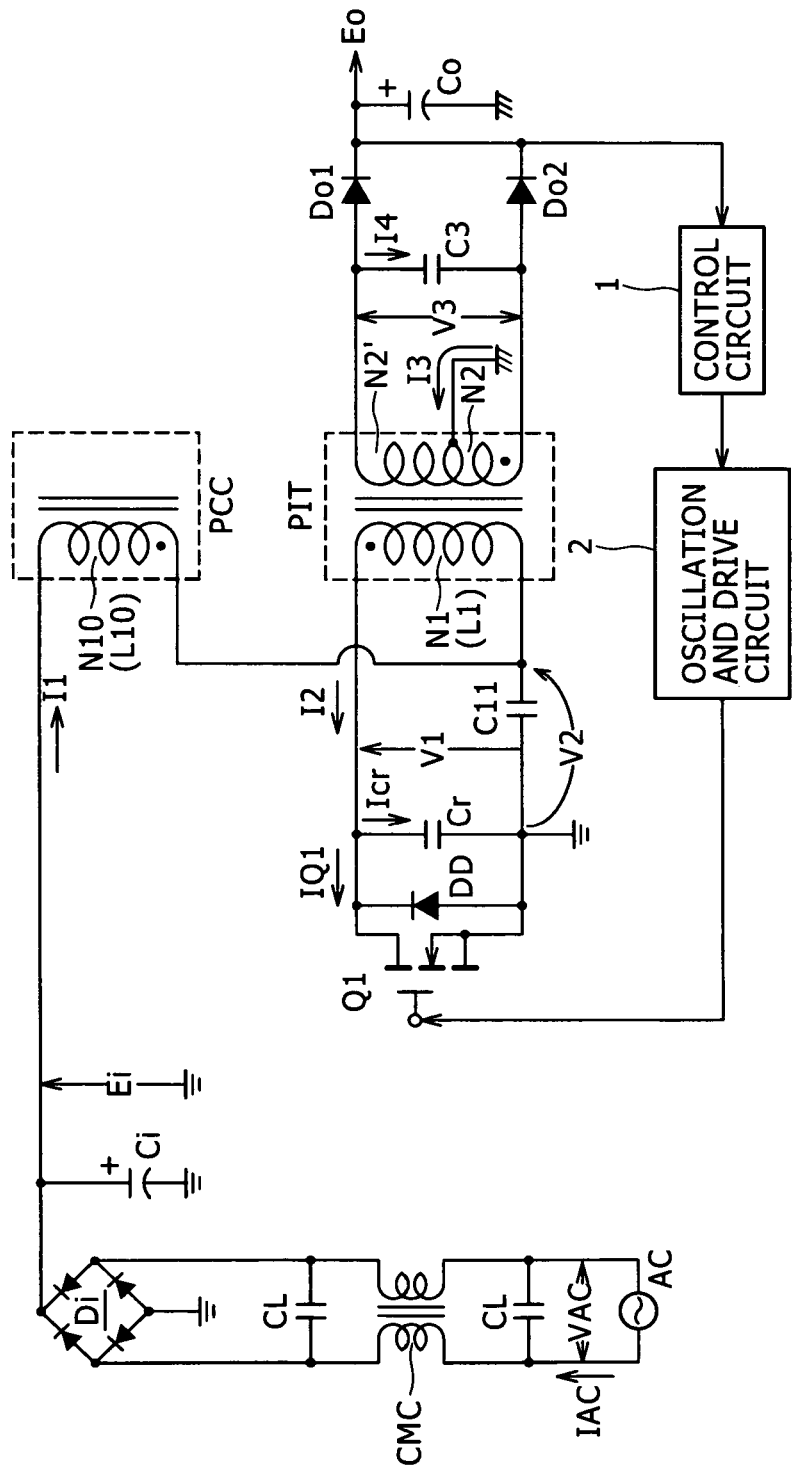
FIG. 1 is a circuit diagram illustrating a configuration example of a power supply circuit as an embodiment of the present invention.

FIG. 1 illustrates a configuration example of a power supply circuit of a first embodiment of the present invention as a power supply circuit with a configuration based on the class-E switching converter. The same parts in FIG. 1 as those in FIG. 8 are given the same numerals and the description therefor will be omitted.

In the power supply circuit shown in FIG. 1, one end of a choke coil winding N10 is connected to the positive electrode of a smoothing capacitor Ci while the other end of the choke coil winding N10 is connected to one end of a primary winding N1. In this circuit, one electrode of a primary-side series resonant capacitor C11 is coupled to the connecting node between one end of the primary winding N1 and the other end of the choke coil winding N10. The other electrode of the primary-side series resonant capacitor C11 is coupled to the connecting node between one electrode of a primary-side parallel resonant capacitor Cr and the source of a switching element Q1, at the primary-side ground potential. Thus, the primary-side series resonant capacitor C11 is connected in series to the primary winding N1.

Also in this circuit, the primary-side parallel resonant capacitor Cr is connected in parallel to the channel between the source and drain of the switching element Q1.

In the present embodiment, the thus provided choke coil winding N10 is equivalent to the winding as the choke coil L10 in FIG. 8. In the present embodiment, the choke coil winding N10 is wound around a core having predetermined shape and size, and thus constructs a component element as a choke coil PCC.

In this circuit configuration, based on the series circuit of the choke coil winding N10 and the primary winding N1 and the primary-side parallel resonant capacitor Cr that is connected in parallel to the series circuit, a primary-side parallel resonant circuit is formed of the capacitance of the primary-side parallel resonant capacitor Cr and the synthetic inductance arising from the inductance L10 of the choke coil winding N10 (choke coil PCC) and the leakage inductance L1 of the primary winding N1.

Furthermore, as a primary-side series resonant circuit, the power supply circuit includes a first primary-side series resonant circuit formed of the capacitance of the primary-side series resonant capacitor C11 and the leakage inductance L1 of the primary winding N1, based on the series connection between the primary-side series resonant capacitor C11 and the primary winding N1. In addition, the power supply circuit includes a second primary-side series resonant circuit formed of the inductance L10 of the choke coil winding N10 and the capacitance of the primary-side series resonant capacitor C11, based on the series connection between the choke coil winding N10 and the primary-side series resonant capacitor C11.

In response to the switching operation of the switching element Q1, charging/discharging currents flow to and from the primary-side parallel resonant capacitor Cr during the periods when the switching element Q1 is in the off-state, due to the voltage resonant operation of the above-described primary-side parallel resonant circuit. These charging/discharging currents generate a resonant pulse voltage with substantially sinusoidal half waves as the voltage across the primary-side parallel resonant capacitor Cr. In the circuit of FIG. 1, since the primary winding N1 is provided in the primary-side parallel resonant circuit, such operation arises in the primary winding N1 that the resonant pulse voltage is superimposed on an alternating voltage arising in response to a switching current.

During the periods when the switching element Q1 is in the on-state, the first primary-side series resonant circuit implements resonant operation so that a resonant current flows through the path of the primary-side series resonant capacitor C11, the primary winding N1, and the switching element Q1.

Furthermore, in response to the switching operation of the switching element Q1, the second primary-side series resonant circuit implements resonant operation so that a resonant current flows through the path of the primary-side series resonant capacitor C11, the choke coil winding N10, and the smoothing capacitor Ci.

Due to the complex operation of the first and second primary-side series resonant circuits, the series resonant current that should flow through the primary winding N1 shunt so as to flow also through the choke coil winding N10 for example.

If the current path of the primary-side series resonant capacitor C11, the primary winding N1, and the switching element Q1, corresponding to the first primary-side series resonant circuit, and the current path of the primary-side series resonant capacitor C11, the choke coil winding N10, and the smoothing capacitor Ci, corresponding to the second primary-side series resonant circuit, are viewed in terms of the alternating current with the switching cycle, both the current paths can be regarded as being parallel to each other with the primary-side series resonant capacitor C11 being common to both the paths.

Since the resonant current is thus shunt, the inductance (L1) obtained across the primary winding N1 and the inductance (L10) obtained across the choke coil winding N10 can be equalized to each other, which allows reduction of the size of the choke coil PCC provided with the choke coil winding N10. Furthermore, the resonant frequency of the first primary-side series resonant circuit is dominated by the value of the leakage inductance (L1) arising in the primary winding N1 and the capacitance value of the primary-side series resonant capacitor C11, while the resonant frequency of the second primary-side series resonant circuit is dominated by the value of the inductance (L10) obtained in the choke coil winding N10 and the capacitance value of the primary-side series resonant capacitor C11. Therefore, by equalizing the inductance (L1) obtained across the primary winding N1 to the inductance (L10) obtained across the choke coil winding N10, the resonant frequency of the first primary-side series resonant circuit and the resonant frequency of the second primary-side series resonant circuit can be equalized to each other. Thus, a favorable control characteristic can be achieved even when the variable range of the frequency of the AC signal supplied from the oscillation and drive circuit 2 serving as part of the control unit to the switching element Q1 is small.

The expression that the resonant frequency is "dominated" indicates the fact that the value of the resonant frequency of the first primary-side series resonant circuit greatly depends upon the value of the leakage inductance (L1) arising in the primary winding N1 and the capacitance value of the primary-side series resonant capacitor C11, and the value of the resonant frequency of the second primary-side series resonant circuit greatly depends upon the value of the inductance (L10) obtained in the choke coil winding N10 and the capacitance value of the primary-side series resonant capacitor C11. Although e.g. the smoothing capacitor Ci also forms part of the second primary-side series resonant circuit, the capacitance value of the smoothing capacitor Ci does not dominate the resonant frequency since it is greatly larger than the capacitance value of the primary-side series resonant capacitor C11.

On the secondary side, the secondary winding is provided with a center tap, and the setting is defined so that the magnitudes of the currents flowing through a rectifier diode Do1 and a rectifier diode Do2 are equal to each other. If the setting is made so that the magnitudes of the currents flowing through the rectifier diode Do1 and the rectifier diode Do2 are equal to each other, the load current uniformly flows over the entire cycles, which can enhance the efficiency of the switching power supply circuit.

Moreover, a secondary-side partial voltage resonant capacitor C3 is provided. Therefore, partial voltage resonance arises, and thus the occurrence of switching loss at the changeover points between the on- and off-states of the rectifier diodes Do1 and Do2 can be prevented, which can further enhance the efficiency of the switching power supply circuit.

Figure 5:
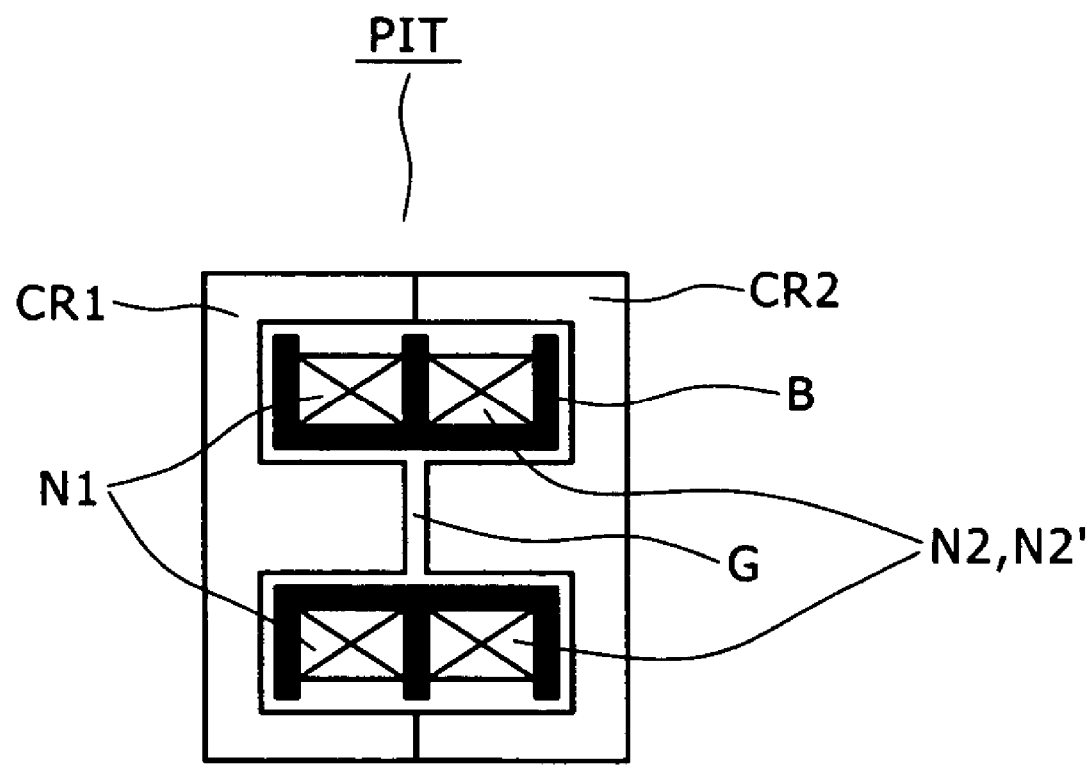
FIG. 5 is a diagram illustrating a structural example of an isolation converter transformer included in the power supply circuit of the embodiment.

More detailed features of the switching power supply circuit shown in FIG. 1 will be described below. FIG. 5 illustrates a structural example of an isolation converter transformer PIT included in the power supply circuit of FIG. 1 with the above-described configuration.

As shown in FIG. 5, the isolation converter transformer PIT includes an EE-core (EE-shaped core) formed by combining E-shaped cores CR1 and CR2 made of a ferrite material in such a manner that their magnetic legs face each other.

Furthermore, a bobbin B is provided that is formed of resin or the like and has such a divided shape that winding parts on the primary side and secondary side are independent of each other. The primary winding N1 is wound around one winding part of the bobbin B. The secondary winding N2 and a secondary winding N2' are wound around the other winding part.

The bobbin B around which the primary-side and secondary-side windings have been thus wound is fitted to the EE-shaped core (CR1, CR2), which results in the state in which the primary-side and secondary-side windings on different winding regions are wound around the center leg of the EE-shaped core. In this manner, the entire structure of the isolation converter transformer PIT is completed.

In the center leg of the EE-shaped core, a gap G having a gap length of e.g. about 1.6 mm or more is formed as shown in the drawing. Thus, a loose coupling state in which a coupling coefficient k is e.g. about 0.75 is obtained. That is, the degree of loose coupling is higher in the isolation converter transformer PIT in FIG. 1, compared with that in the power supply circuit shown in FIG. 10 as a conventional technique. The gap G can be formed by setting the center legs of the E-shaped cores CR1 and CR2 to be shorter than the respective two outer legs thereof. In the present embodiment, EER-35 is used as the core member, and the length of the gap G is set to 2.2 mm. The numbers of turns of the primary winding N1, the secondary winding N2, and the secondary winding N2' are set to 50 T, 35 T, and 45 T, respectively. Furthermore, the coupling coefficient k between the primary and secondary sides of the isolation converter transformer PIT itself is set to a value smaller than 0.7 for example.

The choke coil PCC can also be constructed by providing a winding around an EE-shaped core with predetermined shape and size. In the present embodiment, ER-28 is used as the core member, the length of the gap G is set to 1.2 mm, and the number of turns of the choke coil winding N10 is set to 45 T. Thus, 303 µH is obtained as the inductance value of the inductor L10.

The parameters of major parts in the power supply circuit of FIG. 1 were chosen as follows, so that experimental results to be described later on this power supply circuit were achieved.

The capacitances of the primary-side parallel resonant capacitor Cr, the primary-side series resonant capacitor C11, and the secondary-side partial voltage resonant capacitor C3 were chosen as follows: Cr=5600 pF, C11=0.027 µF, and C3=220 pF.

The primary-side parallel resonant frequency fo1 was set to 85.8 kHz. The primary-side series resonant frequency fo2 dependent upon the primary-side series resonant capacitor C11 and the inductor L1 was set to 54.8 kHz. The primary-side series resonant frequency fo2' dependent upon the primary-side series resonant capacitor C11 and the inductor L10 was set to 55.7 kHz. That is, two primary-side series resonant frequencies fo2 and fo2' were substantially equalized to each other, and were set lower than the primary-side parallel resonant frequency fo1.

The allowable load power range was from the maximum load power Pomax of 300 W to the minimum load power Pomin of 0 W (no load). The rated level of the secondary-side DC output voltage Eo was 175 V.

Figure 2A:
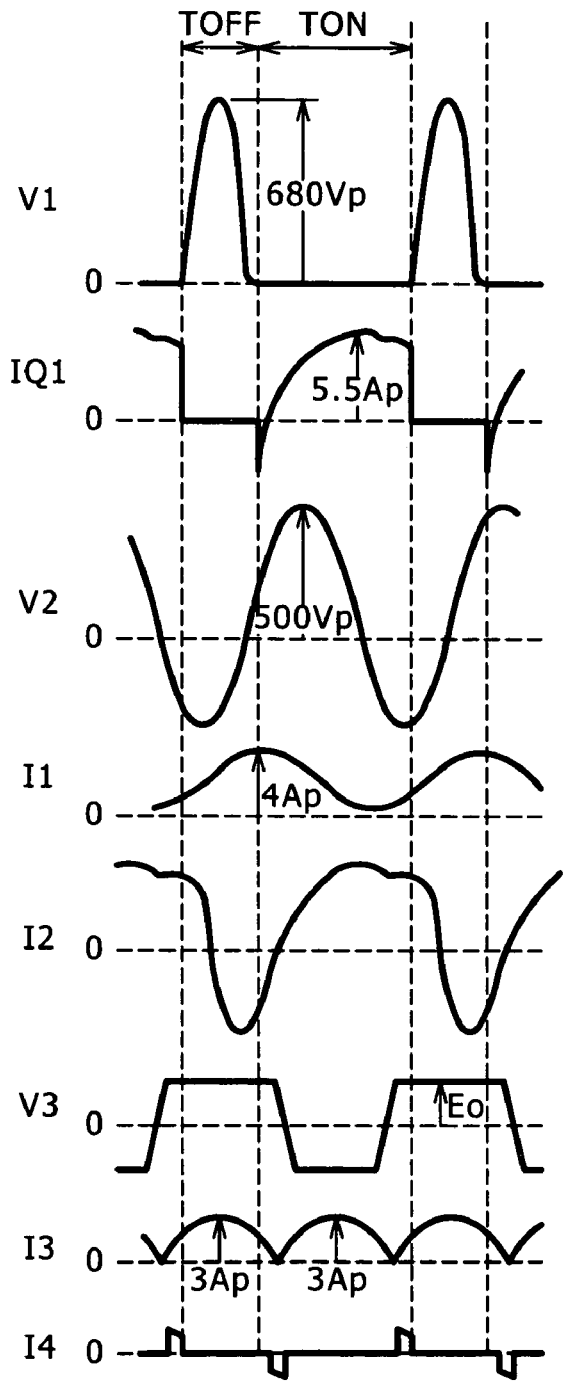
FIGS. 2A and 2B are waveform diagrams showing the operation of major parts in the power supply circuit as the embodiment, with reflecting the corresponding switching cycle.
Figure 2B:
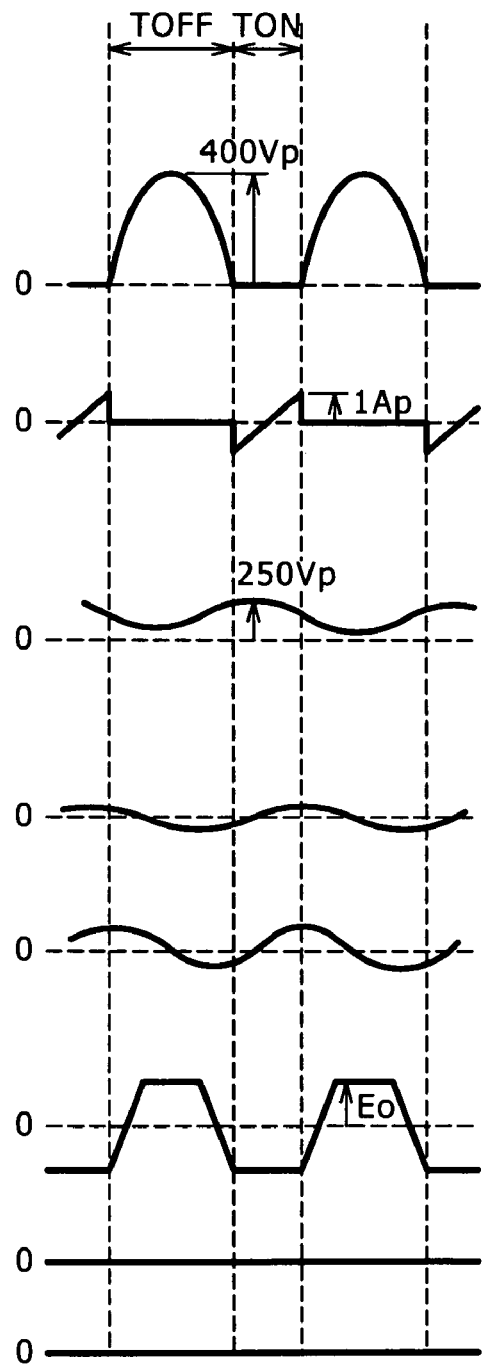

The experimental results on the power supply circuit of FIG. 1 are shown in the waveform diagrams of FIGS. 2A and 2B. FIG. 2A shows a switching voltage V1, a switching current IQ1, a primary winding voltage V2, a choke coil current I1, a primary winding current I2, a secondary-side alternating voltage V3, and a secondary winding current I3 under the condition of the maximum load power Pomax of 300 W and the AC input voltage VAC of 100 V.

FIG. 2B shows the switching voltage V1, the switching current IQ1, the primary winding voltage V2, the choke coil current I1, the primary winding current I2, the secondary-side alternating voltage V3, and the secondary winding current I3 under the condition of the minimum load power Pomin of 0 W and the AC input voltage VAC of 100 V.

The basic operation of the power supply circuit in FIG. 1 will be described below with reference to the waveform diagrams of FIG. 2A.

The input current I1 is the current that flows from the smoothing capacitor Ci to the primary-side switching converter. The input current I1 flows via the synthetic inductance arising from the inductance L10 of the choke coil winding N10 and the leakage inductance L1 of the primary winding N1. Thus, the current flowing from the smoothing capacitor Ci to the switching converter is a ripple current.

The switching element Q1 is provided with the voltage across the smoothing capacitor Ci (Ei) as a DC input voltage, and implements switching operation. The switching voltage V1 is the voltage between the drain and source of the switching element Q1.

The switching current IQ1 is the current that flows through the switching element Q1 (and the body diode DD) from the drain side thereof. Each switching cycle is divided into the period TON during which the switching element Q1 should be in the on-state, and the period TOFF during which it should be in the off-state. The switching voltage V1 has a waveform in which the voltage is at zero level during the period TON and is a resonant pulse during the period TOFF. This voltage resonant pulse of the switching voltage V1 is obtained as a pulse having a sinusoidal resonant waveform due to the resonant operation of the primary-side parallel resonant circuit.

The switching current IQ1 is at zero level during the period TOFF. When the period TOFF ends and the period TON starts, i.e., at the turn-on timing of the switching element Q1, initially the switching current IQ1 flows through the body diode DD and therefore has the negative polarity waveform. Subsequently, the flow direction is inverted so that the switching current IQ1 flows from the drain to the source, and therefore the switching current IQ1 has the positive polarity waveform.

The primary winding current I2 is the current that flows through the primary winding N1 in response to the switching operation of the switching element Q1, and approximately has the waveform arising from the synthesis of the switching current IQ1 and a capacitor current Icr. Due to the ON/OFF operation of the switching element Q1, a resonant pulse voltage, which is the switching voltage V1 in the period TOFF, is applied to the series circuit of the primary winding N1 and the primary-side series resonant capacitor C11, which form the first primary-side series resonant circuit. Thus, the primary-side series resonant circuit implements resonant operation, and the primary winding current I2 has an alternating waveform based on sinusoidal components and dependent upon the switching cycle. The primary winding voltage V2 is the voltage across the primary winding N1. This primary winding voltage V2 also has an alternating waveform based on a sinewave and dependent upon the switching cycle as shown in the waveform diagrams.

When the period TON ends and the period TOFF starts, i.e., at the turn-off timing of the switching element Q1, the primary winding current I2 flows as the capacitor current Icr to the primary-side parallel resonant capacitor Cr with the positive polarity, and thus operation of charging the primary-side parallel resonant capacitor Cr is started. In response to this charging, the switching voltage V1 starts to rise from zero levels with a sinusoidal waveform, i.e., a voltage resonant pulse rises up. When the polarity of the capacitor current Icr turns to the negative polarity, the state of the primary-side parallel resonant capacitor Cr changes from the charging state to the discharging state, which causes the voltage resonant pulse to fall down from its peak level with the sinusoidal waveform.

When the voltage resonant pulse as the switching voltage V1 drops down to zero levels, the period TON during which the switching element Q1 (and the body diode DD) is in the on-state is started. When the cycle sequence reaches the period TON, initially the body diode DD conducts, so that the primary winding current I2 with the negative polarity flows. At this time, the switching voltage V1 is at zero levels. After the primary winding current I2 flows through the body diode DD during a certain period, the switching element Q1 is turned on and thus the positive primary winding current I2 flows therethrough. Since the primary winding current I2 flows through the switching element Q1 (and the body diode DD) during the period TON in this manner, the switching current IQ1 has a waveform like the illustrated one. The above-described operation indicates that, at the turn-on and turn-off timings of the switching element Q1, ZVS operation due to the primary-side parallel resonant circuit and ZCS operation due to the primary-side series resonant circuit are achieved.

The secondary-side alternating voltage V3 indicates the operation of the secondary-side rectifier circuit.

The secondary-side alternating voltage V3 is the voltage across the connection circuit of the secondary windings N2 and N2' and the secondary-side partial voltage resonant capacitor C3, and is input to the secondary-side rectifier circuit. In the period of each half cycle of the voltage V3, a forward voltage is applied to either one of the rectifier diodes Do1 and Do2 in turn, which leads to the alternate conduction of the rectifier diodes Do1 and Do2. Thus, the secondary-side alternating voltage V3 is clamped at the level having the absolute value equal to the secondary-side DC output voltage Eo, in the conducting periods of the rectifier diodes Do1 and Do2.

Since the isolation converter transformer PIT cannot transmit a DC component, if the primary-side waveform involves a distortion from a sinewave, the zero level of the voltage arising in the secondary windings N2 and N2' is defined so that the time integration value of the positive component of the voltage and that of the negative component of the voltage are equal to each other. Therefore, if the numbers of turns of the secondary windings N2 and N2' are the same, the magnitudes of the currents flowing through the rectifier diodes Do1 and Do2 are different from each other.

To address this, in the present embodiment, the numbers of turns of the secondary windings N2 and N2' are set to different numbers of 35 T and 45 T, respectively. Thus, the magnitudes of the currents flowing through the rectifier diodes Do1 and Do2 are equalized to each other.

Furthermore, the provision of the partial voltage resonant capacitor C3 allows the currents at the voltage changeover points to flow to the partial voltage resonant capacitor C3 to thereby improve the efficiency. When the capacitance value of the partial voltage resonant capacitor C3 was in the range of about 200 to 470 pF, a favorable efficiency improvement effect could be achieved.

Figure 3:
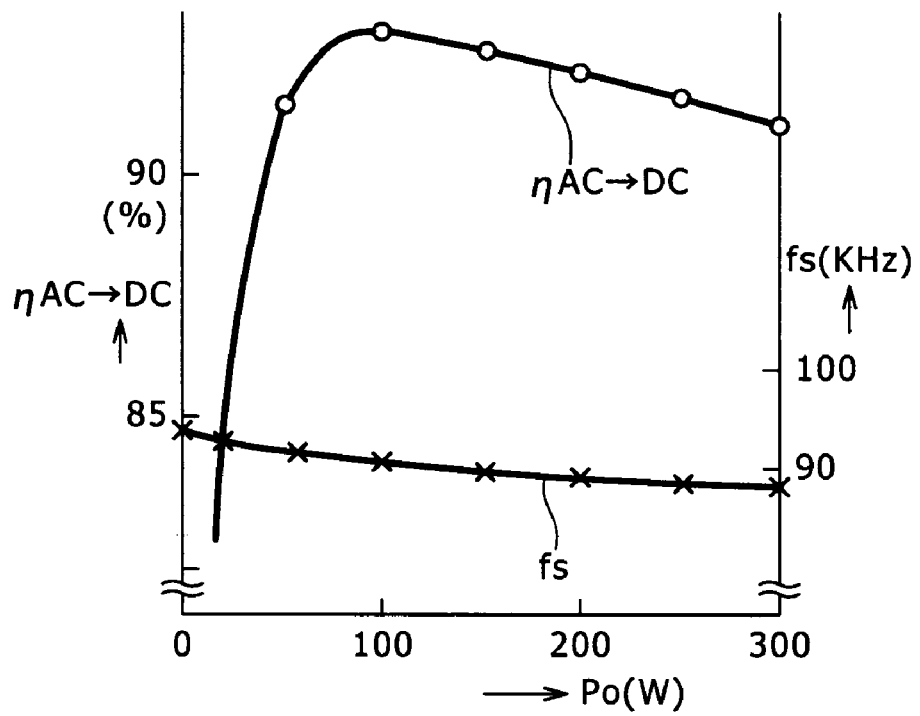
FIG. 3 is a diagram showing, as functions of the load, the variation characteristics of the AC to DC power conversion efficiency and switching frequency of the power supply circuit as the embodiment.
Figure 4:
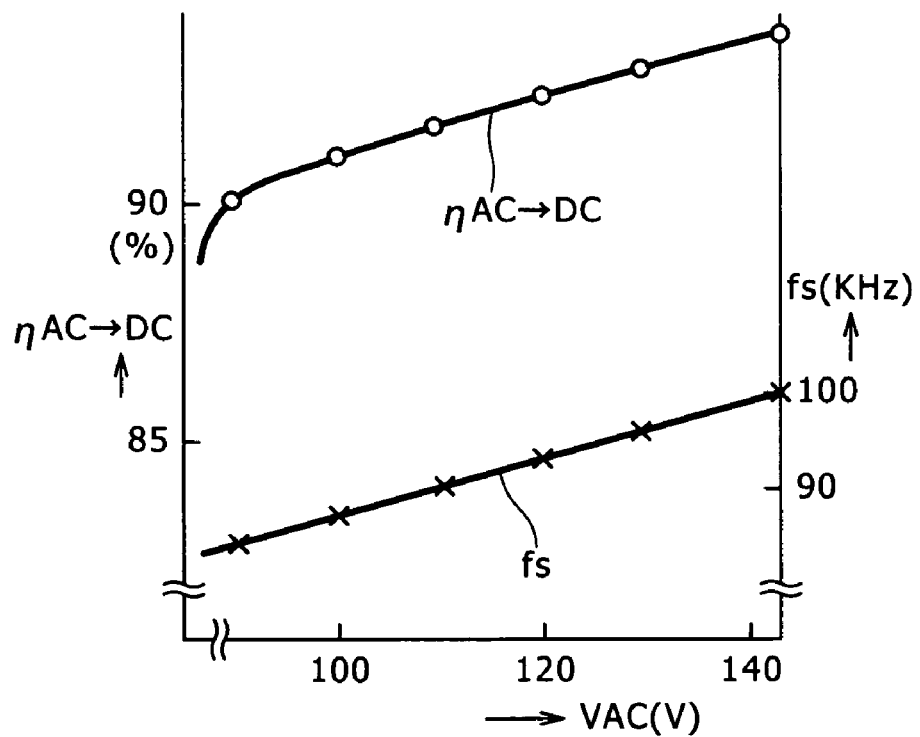
FIG. 4 is a diagram showing, as functions of the input AC voltage, the variation characteristics of the AC to DC power conversion efficiency and switching frequency of the power supply circuit as the embodiment.

According to experiments, the AC to DC power conversion efficiency ($\eta AC \rightarrow DC$) of the modified class-E switching operation multiple resonant converter of the present embodiment shown in FIG. 1 was 91.3% when the load power was the maximum load power Pomax of 300 W, and was 91.7% when it was 100 W as shown in FIG. 3 under the condition of the AC input voltage VAC of 100 V. Furthermore, FIG. 4 shows, as functions of the input AC voltage, the variation characteristic when the load power was the maximum load power Pomax of 300 W, an experimental result that the variable range $\Delta fs$ of the switching frequency fs was 11.0 kHz was obtained.

As described above, in the circuit of FIG. 1, in which a class-E switching converter is applied to the primary-side switching converter, abnormal operation associated with an intermediate load is absent irrespective of the presence of a secondary-side series resonant circuit.

Figure 10:
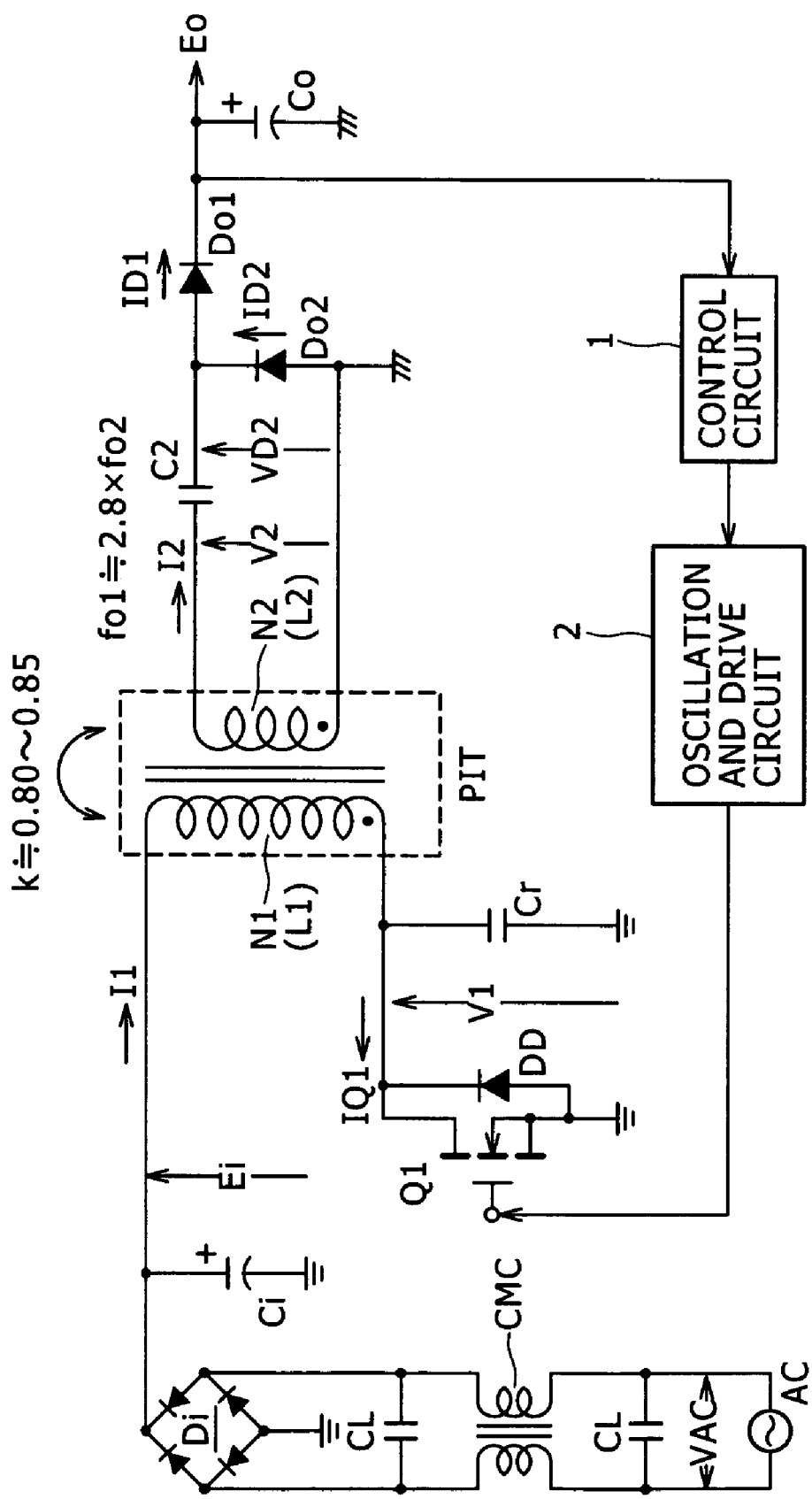
FIG. 10 is a circuit diagram illustrating a configuration example of a power supply circuit as a conventional example.

In the power supply circuit shown in FIG. 10 as a conventional example, the current that flows from the smoothing capacitor Ci into the switching converter passes through the primary winding N1 in the isolation converter transformer PIT, and then reaches the switching element Q1 and the primary-side parallel resonant capacitor Cr. This current flowing from the smoothing capacitor Ci to the switching converter is the primary winding current I1, and has a comparatively high frequency dependent upon the switching cycle. That is, charging and discharging currents flow to and from the smoothing capacitor Ci with a frequency higher than the frequency of the commercial AC voltage.

An aluminum electrolytic capacitor is often employed for a component element as the smoothing capacitor Ci because of the need for the capacitor Ci to have a high breakdown voltage, and so on. The aluminum electrolytic capacitor has an increased tendency to suffer from lowering of the electrostatic capacitance and an increase of the tangent of the loss angle when being operated at a high frequency, compared with other kinds of capacitors. Therefore, there is a need to choose, as the aluminum electrolytic capacitor for the smoothing capacitor Ci, a special product of which equivalent series resistance (ESR) is low, and of which allowable ripple current is large. In addition, there is also a need to increase the capacitance of the component as the smoothing capacitor Ci correspondingly. For example, in the configuration of FIG. 10, the capacitance needs to be about 1000 μF in order to address the maximum load power Pomax of 300 W, which is the same as the maximum load power in the present embodiment. An aluminum electrolytic capacitor compatible with these requirements is more expensive than general-purpose aluminum electrolytic capacitors, and the increase of the capacitance leads to a rise of the component price. Therefore, use of such a special capacitor is disadvantageous in terms of costs.

In contrast, in the power supply circuit of the present embodiment in FIG. 1, the current that flows from the smoothing capacitor Ci into the switching converter passes through the series connection of the choke coil winding N10 and the primary winding N1, and then reaches the switching element Q1. Therefore, the current flowing from the smoothing capacitor Ci to the switching converter becomes a DC current as indicated by the input current I1 of FIG. 2A. Since the current flowing from the smoothing capacitor Ci to the switching converter is a DC current, the present embodiment does not involve the above-described problems of lowering of the electrostatic capacitance and an increase of the tangent of the loss angle. Furthermore, along with this, a ripple with the cycle of the commercial AC supply voltage in the DC input voltage Ei is also reduced. This ripple is 5 Vp-p in the power supply circuit in FIG. 1, in contrast to e.g. the power supply circuit of FIG. 10, in which the ripple is 7.5 Vp-p. Thus, in the present embodiment, a general-purpose aluminum electrolytic capacitor can be chosen as the smoothing capacitor Ci. In addition, the capacitance of the component as the smoothing capacitor Ci can be lowered compared with in the circuit of FIG. 10, since the ripple voltage is small. A capacitance of 680 μF is allowed in an actual power supply circuit of FIG. 1. Thus, the present embodiment can achieve cost reduction of the smoothing capacitor Ci. Furthermore, the waveform of the input current I1 is a sinusoidal waveform. This also contributes to achievement of the high-frequency noise reduction effect.

Figure 11:
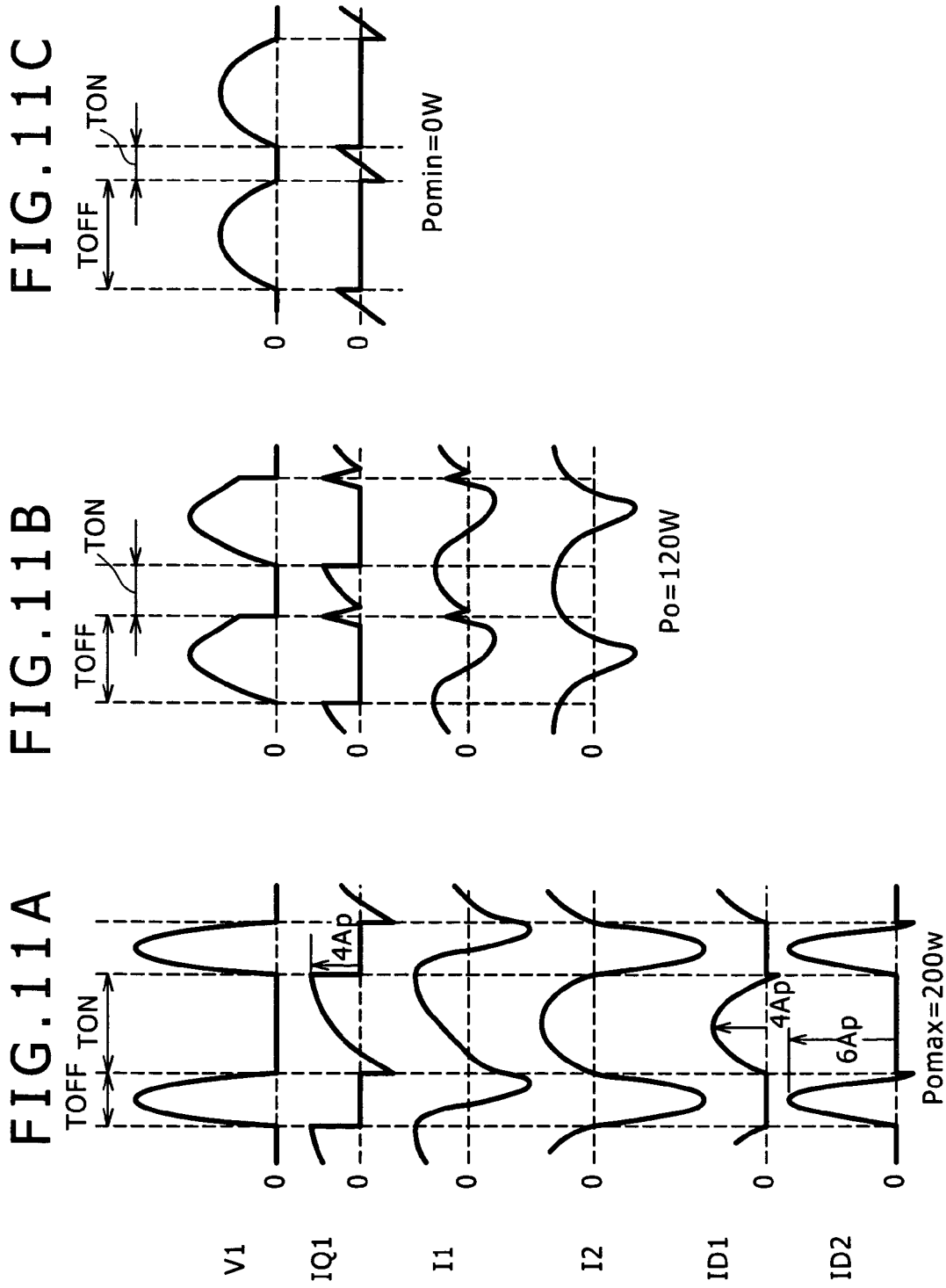
FIGS. 11A, 11B and 11C are waveform diagrams showing the operation of major parts in the power supply circuit shown in FIG. 10.
Figure 12:
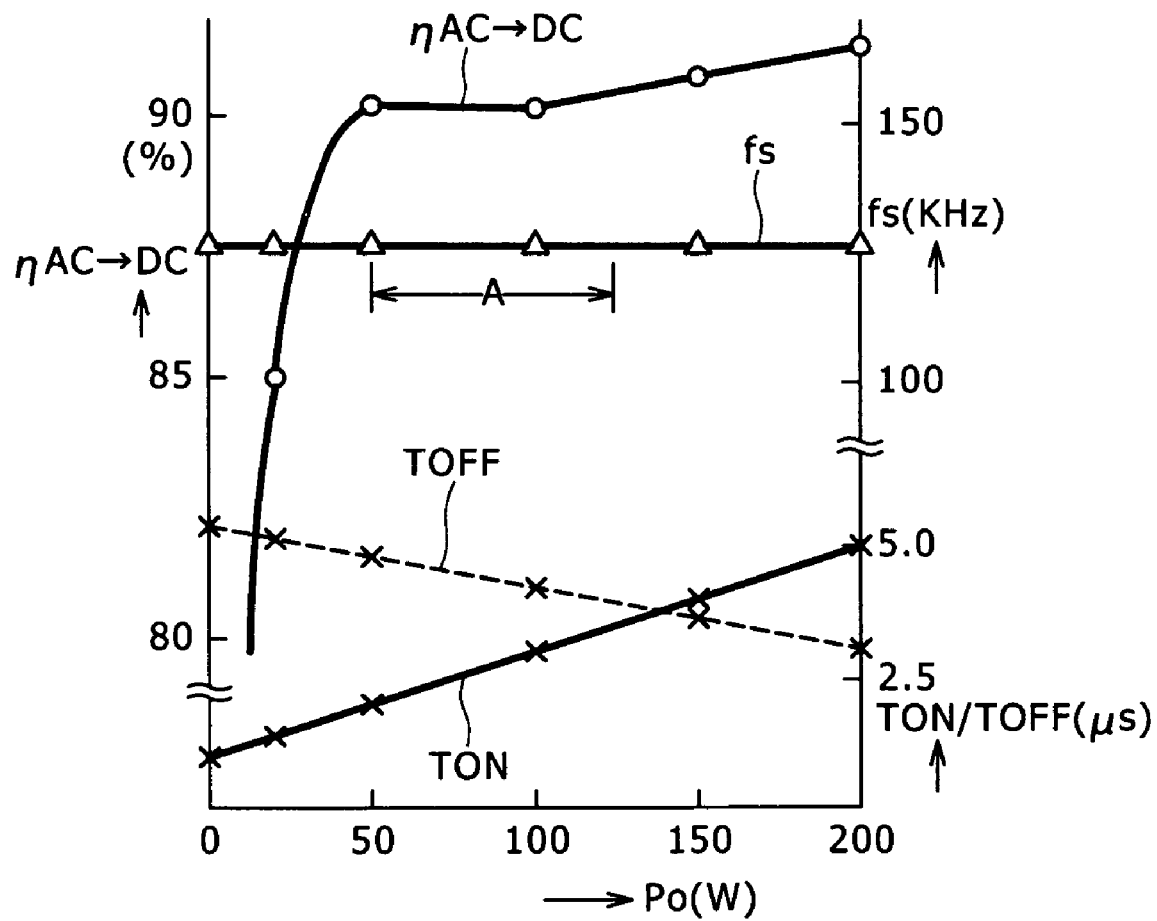
FIG. 12 is a diagram showing, as functions of the load, the variation characteristics of the AC to DC power conversion efficiency, the switching frequency, and the lengths of ON and OFF periods of a switching element, regarding the power supply circuit shown in FIG. 10.
Figure 13:
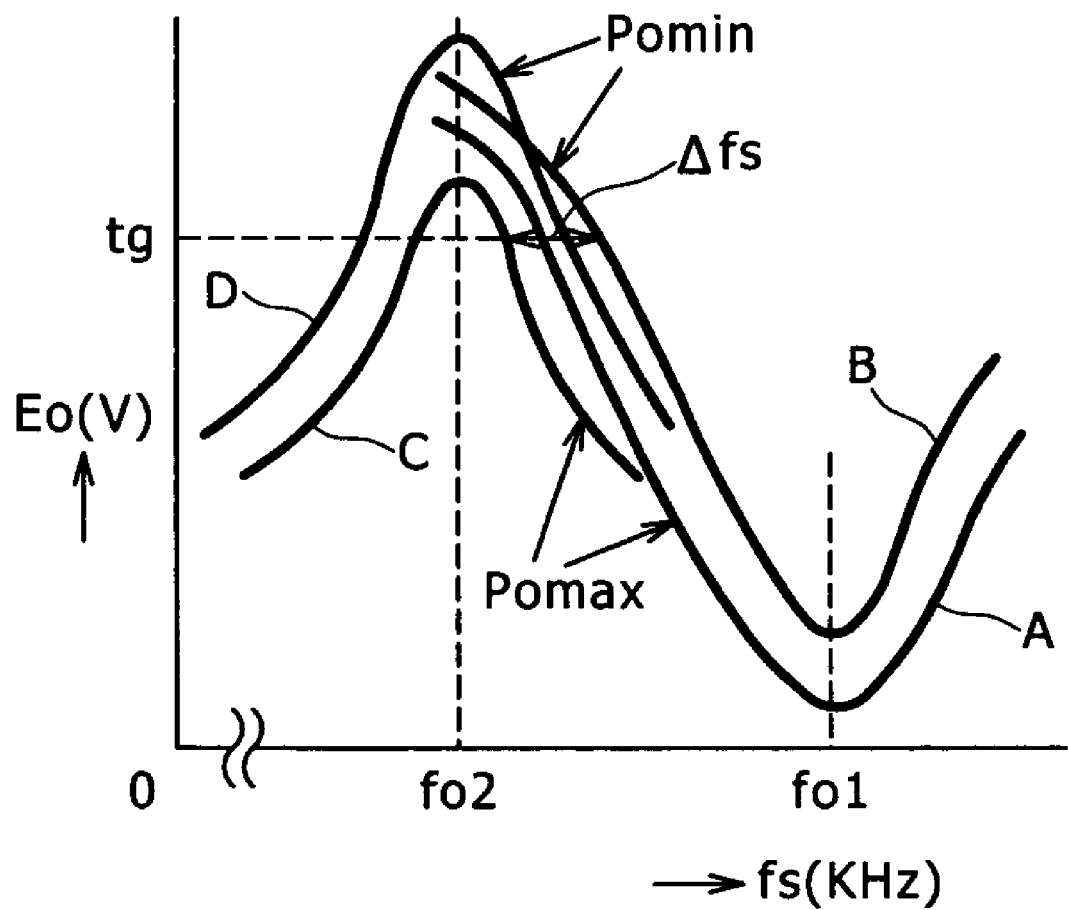
FIG. 13 is a diagram conceptually showing the constant-voltage control characteristic of the power supply circuit shown in FIG. 10.

In addition, the present embodiment eliminates the occurrence of abnormal operation associated with an intermediate load, to thereby allow adequate ZVS operation also as described above. In this abnormal operation phenomenon, the switching element Q1 is turned on and the positive switching current IQ1 flows between the source and drain thereof before the original turn-on timing of the switching element Q1 (the start timing of the period TON), as shown in FIG. 11B. Such operation of the switching current IQ1 increases switching loss. The present embodiment prevents the occurrence of the abnormal operation of the switching current IQ1, and thus eliminates the increase of switching loss. This feature is also one factor in the enhancement of the power conversion efficiency.

As is apparent from a comparison between the switching currents IQ1 of FIGS. 2A and 11A, the switching current IQ1 of FIG. 2A, corresponding to the present embodiment, has a waveform in which current peaks appear at timings before the end timings of the period TON. The waveform of the switching current IQ1 shown in FIG. 2A indicates that the level of the switching current IQ1 at the turn-off timing of the switching element Q1 is suppressed. If the level of the switching current IQ1 at the turn-off timing is suppressed, the switching loss at the turn-off timing is correspondingly reduced, which enhances the power conversion efficiency.

Such a waveform of the switching current IQ1 is due to the class-E switching operation of the primary-side switching converter.

In the present embodiment, as a primary-side series resonant circuit, two circuits of the first primary-side series resonant circuit and second primary-side series resonant circuit are provided. Thus, as described above, the series resonant current that should flow in the primary side flows with being divided to the primary winding N1 and the choke coil winding N10. This current division decreases the magnitude of the primary winding current I2, and hence improves the efficiency.

Furthermore, in the present embodiment, the waveform of the input current I1 is a sinusoidal waveform, which also contributes to achievement of the high-frequency noise reduction effect.

In addition, as for the secondary side, the numbers of turns of the secondary windings N2 and N2' are made different, and thus the currents of both the positive and negative polarities generated dependent upon the polarities of magnetic flux are equalized to each other, so that an efficiency improvement is achieved. Moreover, a secondary-side partial voltage resonant circuit is provided. Thus, at the turn-on/turn-off timings of the secondary-side rectifier diodes, partial voltage resonant operation is implemented, and thus the current that is originally directed toward the secondary-side rectifier diodes flows to the secondary-side partial voltage resonant capacitor, which reduces the conduction loss and switching loss in the rectifier diodes.

Figure 6:
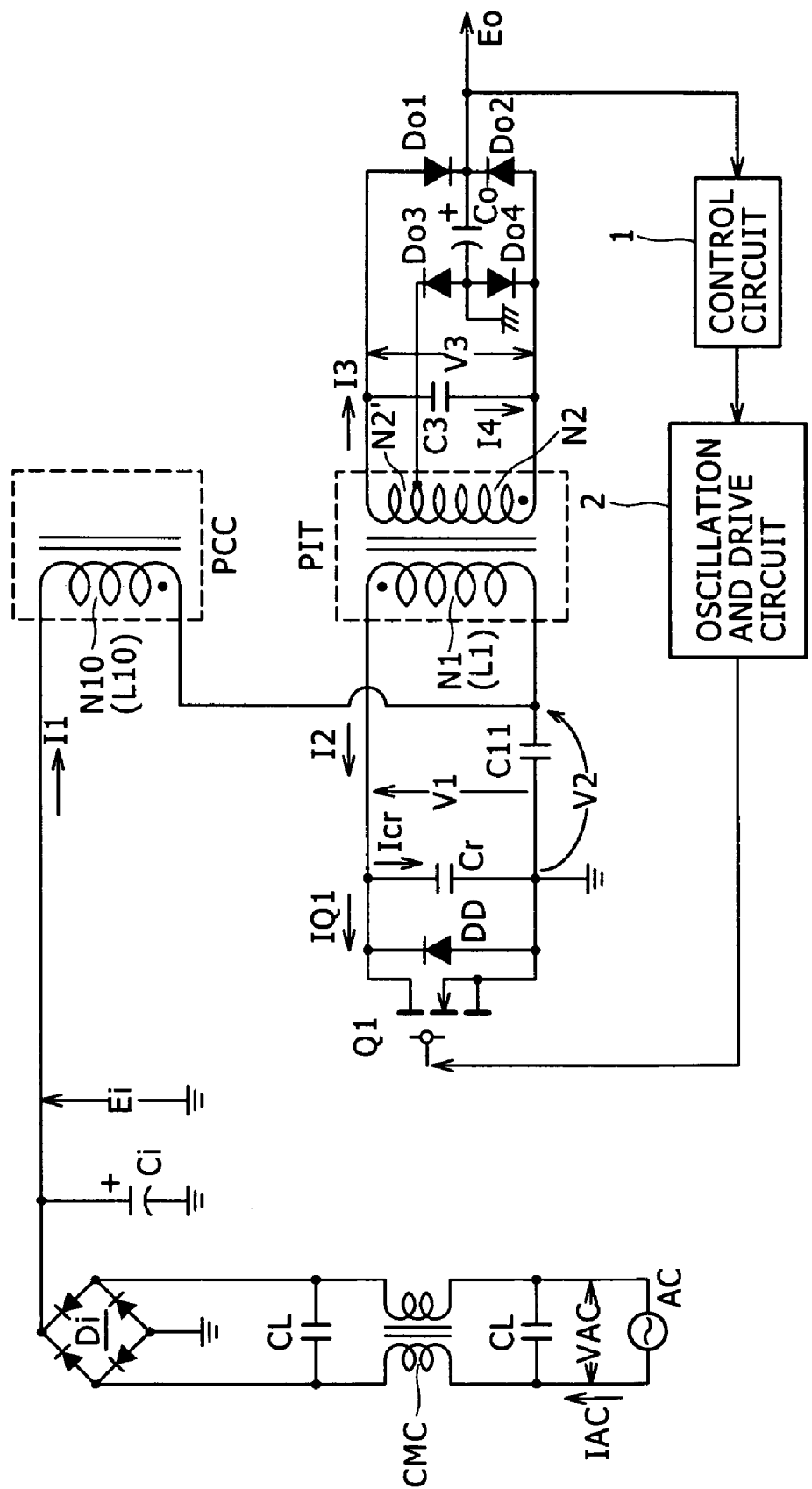
FIG. 6 is a circuit diagram illustrating a first modification of the secondary side of the power supply circuit as the embodiment.

FIG. 6 illustrates a first modification of the power supply circuit of the embodiment. The same parts in FIG. 6 as those in FIG. 1 are given the same numerals and the description therefor will be omitted.

The secondary side of the power supply circuit includes a secondary winding N2 and a secondary winding N2'. The secondary windings N2 and N2' are connected in series to each other so that voltages arising in the respective secondary windings are added to each other. Secondary-side rectifier elements include rectifier diodes Do1, Do2, Do3, and Do4. The rectifier diodes Do1 and Do2 are connected in series to each other with the respective cathodes, which are the same-polarity ends of one polarity, being connected to each other. The rectifier diodes Do3 and Do4 are connected in series to each other with the respective anodes, which are the same-polarity ends of the other polarity, being connected to each other. Both the ends of the secondary winding arising from the series connection of the secondary windings N2 and N2' are connected to the ends of the series connection of the rectifier diodes Do1 and Do2. Both the ends of the secondary winding N2 are connected to the ends of the series connection of the rectifier diodes Do3 and Do4. A secondary-side smoothing capacitor Co is coupled to the connecting node between the rectifier diodes Do1 and Do2, and to the connecting node between the rectifier diodes Do3 and Do4.

If such a configuration is employed, due to magnetic flux in one direction, the voltage arising in the series connection of the secondary windings N2 and N2' causes a current to flow through the rectifier diode Do1, the secondary-side smoothing capacitor Co, and the rectifier diode Do4. Furthermore, due to magnetic flux in the other direction, the voltage arising in the secondary winding N2 causes a current to flow through the rectifier diode Do3, the secondary-side smoothing capacitor Co, and the rectifier diode Do2. The ratio of the number of turns of the secondary winding N2 to that of the secondary winding N2' is defined so that the magnitudes of the currents flowing in both the directions are equalized to each other.

When the voltage resonant pulse as the switching voltage V1 drops down to zero level, the period TON during which the switching element Q1 (and the body diode DD) is in the on-state is started. When the cycle sequence reaches the period TON, initially the body diode DD conducts, so that the primary winding current I2 with the negative polarity flows. At this time, the switching voltage V1 is at zero level. After the primary winding current I2 flows through the body diode DD during a certain period, the switching element Q1 is turned on and thus the positive primary winding current I2 flows therethrough. Since the primary winding current I2 flows through the switching element Q1 (and the body diode DD) during the period TON in this manner, the switching current IQ1 has a waveform like the illustrated one. The above-described operation indicates that, at the turn-on and turn-off timings of the switching element Q1, ZVS operation due to the primary-side parallel resonant circuit and ZCS operation due to the primary-side series resonant circuit are achieved.

The secondary-side alternating voltage V3 indicates the operation of the secondary-side rectifier circuit.

The secondary-side alternating voltage V3 is the voltage across the connection circuit of the secondary windings N2 and N2' and the secondary-side partial voltage resonant capacitor C3, and is input to the secondary-side rectifier circuit. In the periods of half cycles of one polarity of the voltage V3, a forward voltage is applied to the rectifier diodes Do1 and Do4, which leads to the conduction of the rectifier diodes Do1 and Do4.

In addition, although not shown in the drawing, in the periods of half cycles of the voltage in the secondary winding N2, a forward voltage is applied to the rectifier diodes Do3 and Do2, which leads to the conduction of the rectifier diodes Do3 and Do2. Thus, the secondary-side alternating voltage V3 and the voltage of the secondary winding N2 (not shown) are clamped at the level corresponding to the secondary-side DC output voltage Eo.

Since the isolation converter transformer PIT cannot transmit a DC component, if the primary-side waveform involves a distortion from a sinewave, the zero level of the secondary-side alternating voltage V3 and the voltage of the secondary winding N2 is defined so that the time integration value of the positive component of the voltages and that of the negative component of the voltages are equal to each other. Therefore, if the difference of the number of turns between the secondary windings N2 and N2' is 0 T, the magnitude of the current flowing through the rectifier diodes Do1 and Do4 is different from that of the current flowing through the rectifier diodes Do3 and Do2.

To address this, the numbers of turns of the secondary windings N2 and N2' are set to 35 T and 10 T, respectively. By thus making the numbers of turns different, the magnitude of the current flowing through the rectifier diodes Do1 and Do4 is equalized to that of the current flowing through the rectifier diodes Do3 and Do2.

Furthermore, the provision of the partial voltage resonant capacitor C3 allows the currents at the voltage changeover points to flow to the partial voltage resonant capacitor C3 to thereby improve the efficiency.

According to experiments, the AC to DC power conversion efficiency ($\eta$AC→DC) of the modified class-E switching operation multiple resonant converter of the first modification shown in FIG. 6 was 91% when the load power was the maximum load power Pomax of 300 W, and was 93% when it was 100 W. In addition, an experimental result that the variable range $\Delta$fs of the switching frequency fs was 10.7 kHz was obtained, and the power conversion efficiency ($\eta$AC→DC) was enhanced as the commercial AC supply voltage increased.

Figure 7:
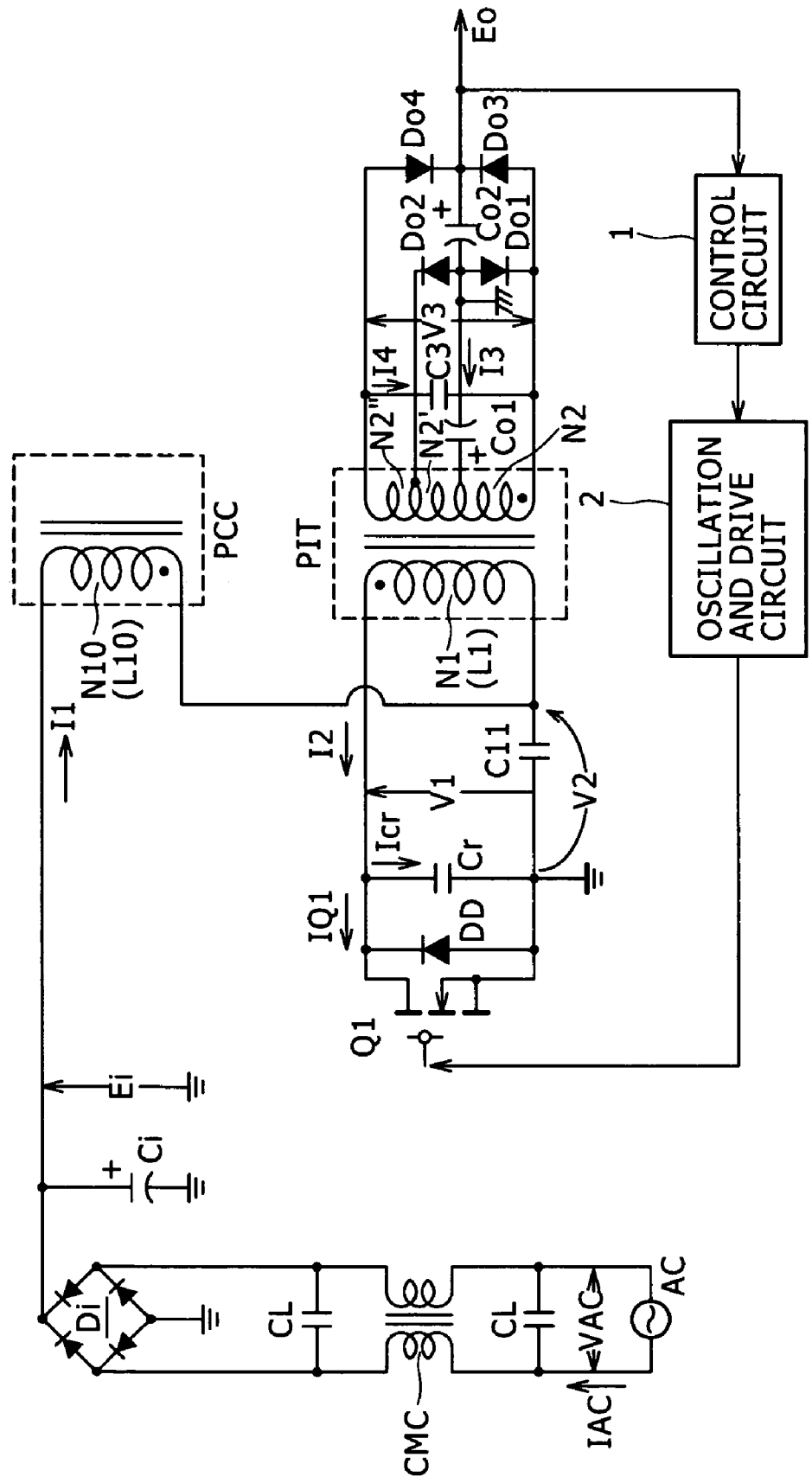
FIG. 7 is a circuit diagram illustrating a second modification of the secondary side of the power supply circuit as the embodiment.

FIG. 7 illustrates a second modification of the power supply circuit of the embodiment. The same parts in FIG. 7 as those in FIG. 1 are given the same numerals and the description therefor will be omitted.

On the secondary side of the power supply circuit, an isolation converter transformer PIT includes a plurality of secondary windings: a secondary winding N2, a secondary winding N2', and a secondary winding N2". Secondary-side rectifier elements include a plurality of rectifier diodes Do1 to Do4 that rectify the AC voltage output from the plural secondary windings. Secondary-side smoothing capacitors include a secondary-side smoothing capacitor Co1 and a secondary-side smoothing capacitor Co2 to which the rectified voltage produced through the rectifier diodes Do1 to Do4 is charged. The secondary-side rectifying and smoothing circuit serves as a voltage-doubler rectifying and smoothing circuit that produces the output DC voltage arising from addition of the voltages charged in the secondary-side smoothing capacitors Co1 and Co2. In addition, the configuration of the secondary side is characterized in that the ratio of the number of turns among the secondary windings N2, N2' and N2" is defined so that the magnitudes of the currents in the positive and negative directions, which flow through the rectifier diodes depending on the magnetic flux in the positive and negative directions generated in the isolation converter transformer, are equal to each other.

Referring to FIG. 7, the secondary winding includes the secondary winding N2, the secondary winding N2', and the secondary winding N2" that are connected to each other so that the voltages generated in the respective windings are added to each other. The secondary-side rectifying and smoothing circuit includes the rectifier diodes Do1 to Do4, and the secondary-side smoothing capacitors Co1 and Co2. The positive electrode of the secondary-side smoothing capacitor Co1 is coupled to the connecting node between the secondary windings N2 and N2'. The cathode of the rectifier diode Do1 is connected to an end of the secondary winding N2, which is also an end of the entire secondary winding, and the anode of the rectifier diode Do1 is connected to the negative electrode of the secondary-side smoothing capacitor Co1. The cathode of the rectifier diode Do2 is coupled to the connecting node between the secondary windings N2' and N2", and the anode of rectifier diode Do2 is connected to the negative electrode of the secondary-side smoothing capacitor Co1. The anode of the rectifier diode Do3 is connected to the end of the secondary winding N2, which is also the end of the entire secondary winding. The anode of the rectifier diode Do4 is connected to an end of the secondary winding N2", which is also an end of the entire secondary winding, and the cathode of the rectifier diode Do4 is connected to the cathode of the rectifier diode Do3. The positive electrode of the secondary-side smoothing capacitor Co2 is coupled to the connecting node between the rectifier diodes Do3 and Do4, and the negative electrode of the secondary-side smoothing capacitor Co2 is coupled to the connecting node among the rectifier diodes Do1 and Do2 and the secondary-side smoothing capacitor Co1. The ratio of the number of turns among the secondary windings N2, N2' and N2" is defined so that the magnitudes of the currents flowing through the rectifier diodes Do1 and Do2 are equal to each other, and so that the magnitudes of the currents flowing through the rectifier diodes Do3 and Do4 are equal to each other.

If the setting is made so that the currents flowing through the rectifier diodes Do1 and Do2 are equal to each other and so that the currents flowing through the rectifier diodes Do3 and Do4 are equal to each other, the load current uniformly flows over the entire cycles of the AC voltage, which can enhance the efficiency of the switching power supply circuit.

Moreover, a secondary-side partial voltage resonant capacitor C3 is provided. Therefore, partial voltage resonance arises, and thus the occurrence of switching loss at the changeover points between the on- and off-states of the rectifier diodes Do1 and Do2 can be prevented, which can further enhance the efficiency of the switching power supply circuit.

The secondary-side alternating voltage V3 indicates the operation of the secondary-side rectifier circuit.

The secondary-side alternating voltage V3 is the voltage across the connection circuit of the secondary windings N2 and N2' and the secondary-side partial voltage resonant capacitor C3, and is input to the secondary-side rectifier circuit. In the period of each half cycle of the voltage V3, a forward voltage is applied to either one of the rectifier diodes Do1 and Do2 in turn, which leads to the alternate conduction of the rectifier diodes Do1 and Do2. Thus, the secondary-side alternating voltage V3 is clamped at the level having the absolute value equal to the secondary-side DC output voltage Eo, in the conducting periods of the rectifier diodes Do1 and Do2.

Since the isolation converter transformer PIT cannot transmit a DC component, if the primary-side waveform involves a distortion from a sinewave, the zero level of the voltage arising in the secondary windings N2 and N2' is defined so that the time integration value of the positive component of the voltage and that of the negative component of the voltage are equal to each other. Therefore, if the numbers of turns of the secondary windings N2 and N2' are the same, the magnitudes of the currents flowing through the rectifier diodes Do1 and Do2 are different from each other.

To address this, the numbers of turns of the secondary windings N2 and N2' are set to different numbers of 35 T and 45 T, respectively. Thus, the magnitudes of the currents flowing through the rectifier diodes Do1 and Do2 are equalized to each other.

Furthermore, the provision of the partial voltage resonant capacitor C3 allows the currents at the voltage changeover points to flow to the partial voltage resonant capacitor C3 to thereby improve the efficiency.

According to experiments, the AC to DC power conversion efficiency ($\eta AC \rightarrow DC$) of the modified class-E switching operation multiple resonant converter of the second modification shown in FIG. 7 was 91% when the load power was the maximum load power Pomax of 300 W, and was 92.9% when it was 100 W. Furthermore, an experimental result that the variable range $\Delta fs$ of the switching frequency fs was 10.2 kHz was obtained. This range is about half the range in the circuit shown in FIG. 10.

It should be noted that the present invention is not limited to the above-described configurations as the embodiment and modifications. For example, as the switching element, e.g. an insulated gate bipolar transistor (IGBT) or a bipolar transistor may be used instead of a MOS-FET. Moreover, although the above-described embodiment and modifications employ a separately-excited switching converter, the present invention can be applied also to a configuration employing a self-excited switching converter.

What is claimed is:

1. A switching power supply circuit comprising:
   a switching element that implements switching for a direct-current (DC) voltage to thereby convert the DC voltage into an alternating-current (AC) voltage;
   a converter transformer that includes a primary winding and a secondary winding, the AC voltage being input to the primary winding so that an AC voltage is generated in the secondary winding;
   a secondary-side rectifying and smoothing circuit that includes a secondary-side rectifier element and a secondary-side smoothing capacitor for rectifying and smoothing the AC voltage generated in the secondary winding to thereby produce an output DC voltage; and
   switching element control means that controls the switching element based on the output DC voltage;
   wherein the DC voltage is supplied to one winding end of the primary winding in the converter transformer via a choke coil, and the switching element is connected to the other winding end of the primary winding in the converter transformer so that the AC voltage is generated,
   a series resonant capacitor is coupled to a connecting node between the one winding end of the primary winding in the converter transformer and the choke coil, so that a first series resonant circuit of which resonant frequency is dominated by a leakage inductance arising in the primary winding in the converter transformer and the series resonant capacitor is formed, and so that a second series resonant circuit of which resonant frequency is dominated by an inductance of the choke coil and the series resonant capacitor is formed, and the resonant frequency of the first series resonant circuit and the resonant frequency of the second series resonant circuit are set to be substantially equal to each other, a parallel resonant circuit of which resonant frequency is dominated by a primary-side parallel resonant capacitor connected in parallel to the switching element, the inductance of the choke coil and the leakage inductance arising in the primary winding is formed, and the resonant frequency of the parallel resonant circuit is set higher than the resonant frequency of the first series resonant circuit and the resonant frequency of the second series resonant circuit, and the secondary winding includes a first secondary winding and a second secondary winding so that currents in directions of opposite polarities are extracted from the first and second secondary windings through a first rectifier diode and a second rectifier diode, respectively, included in the secondary-side rectifier element, and a ratio of the number of turns of the first secondary winding to the number of turns of the second secondary winding is defined so that magnitudes of the currents in directions of opposite polarities are substantially equal to each other.

2. The switching power supply circuit according to claim 1, further comprising a primary-side rectifying and smoothing circuit that includes a primary-side rectifier element and a primary-side smoothing capacitor for rectifying and smoothing an AC voltage to thereby produce a rectified and smoothed voltage, and supplies the DC voltage.

3. The switching power supply circuit according to claim 1, wherein the secondary-side rectifier element includes series connection of the first rectifier diode and the second rectifier diode of which same-polarity ends of one polarity are connected to each other, and series connection of a third rectifier diode and a fourth rectifier diode of which same-polarity ends of the other polarity are connected to each other, both ends of the secondary winding are connected to each end of the series connection of the first rectifier diode and the second rectifier diode, and both ends of the first secondary winding are connected to each end of the series connection of the third rectifier diode and the fourth rectifier diode, and the secondary-side smoothing capacitor is connected to a connecting node between the first rectifier diode and the second rectifier diode and to a connecting node between the third rectifier diode and the fourth rectifier diode.

4. The switching power supply circuit according to claim 1, wherein the secondary-side rectifier element includes a plurality of rectifier diodes that rectify an AC voltage output from a plurality of secondary windings, the secondary-side smoothing capacitor includes a plurality of capacitors to which a rectified voltage generated through the plurality of rectifier diodes is charged, the secondary-side rectifying and smoothing circuit serves as a voltage-doubler rectifying and smoothing circuit that produces an output DC voltage arising from addition of voltages charged in the plurality of capacitors, and a ratio of the number of turns among the plurality of secondary windings is defined so that magnitudes of currents in positive and negative directions flowing through the rectifier diodes depending on magnetic flux in positive and negative directions generated in the converter transformer are equal to each other.

5. The switching power supply circuit according to claim 1, claim 3, or claim 4, wherein one end of the first secondary winding and one end of the second secondary winding are connected in series to each other via a connecting node therebetween so that voltages generated in the first and second secondary windings are added to each other, and a partial voltage resonant capacitor for offering partial voltage resonance is connected to the other end of the first secondary winding and the other end of the second secondary winding.

* * * * *